United States Patent
Kulkarni et al.

(10) Patent No.: US 9,137,225 B2
(45) Date of Patent: Sep. 15, 2015

(54) SEAMLESS REMOTE STORAGE OF UNIFORMLY ENCRYPTED DATA FOR DIVERSE PLATFORMS AND DEVICES

(76) Inventors: Raghavendra Kulkarni, West Hills, CA (US); Sreedhar Acharya B, Bangalore (IN); Raghavendra Prasad Meengga, Bangalore (IN)

(*) Notice: Subject to any disclaimer, the term of this patent is extended or adjusted under 35 U.S.C. 154(b) by 540 days.

(21) Appl. No.: 13/453,995

(22) Filed: Apr. 23, 2012

(65) Prior Publication Data
US 2013/0283038 A1 Oct. 24, 2013

(51) Int. Cl.
*H04L 29/06* (2006.01)
*H04L 29/08* (2006.01)

(52) U.S. Cl.
CPC ........... *H04L 63/065* (2013.01); *H04L 67/1097* (2013.01)

(58) Field of Classification Search
CPC ........................ H04L 63/065; H04L 67/1097
USPC ........................................................ 713/153
See application file for complete search history.

(56) References Cited

U.S. PATENT DOCUMENTS

2010/0332818 A1* 12/2010 Prahlad et al. ................ 713/150
2013/0080765 A1* 3/2013 Mohanty et al. .............. 713/150

* cited by examiner

*Primary Examiner* — Jeffrey Pwu
*Assistant Examiner* — Thong Truong
(74) *Attorney, Agent, or Firm* — Bruce Hare; Palak Bhakta

(57) ABSTRACT

A way of providing seamless remote data storage and access with a universal encryption key is provided. Data may be able to be uploaded from and/or downloaded to a variety of user devices and/or types of user devices. During transfer of data, a secure communication channel may be established between a user device and a destination storage. Data may be compressed and/or encrypted before being passed to the destination storage. Such compression and/or encryption may be performed at the user device or an intermediate processing module. Likewise, when downloading data, the data may be decompressed and/or decrypted before being made available to a destination user device. Such decompression and/or decryption may be performed at the destination device or the intermediate processing module. In any case, the universal encryption key may be utilized by all user devices to generate uniformly encrypted data.

12 Claims, 21 Drawing Sheets

1

SEAMLESS REMOTE STORAGE OF UNIFORMLY ENCRYPTED DATA FOR DIVERSE PLATFORMS AND DEVICES

BACKGROUND

A typical user of electronic devices may access, generate, manipulate, and/or store data on a variety of different user devices. The different user devices may include various different types of device (e.g., Smartphones, personal computers or "PCs", tablet devices, home electronics, industrial electronics, etc.). Such devices may operate using a variety of different platforms (e.g., Windows, Mac OS, Android, etc.). In addition, the devices may utilize files with various structures and/or components.

Many users may want to store their data using a remote storage (e.g., cloud storage) such that the users may access their data using multiple devices independent of the original source device of the data (e.g., a user may wish to take photos using a Smartphone and edit those photos using a PC, a user may wish to use a tablet device to access a set of files generated using a PC, etc.).

Current remote storage solutions may not allow a user to use a universal encryption key across all devices. In addition, any encryption key may be exposed when authenticating a user device during storage or retrieval of data.

In some situations, a user also may not wish to burden the user device (e.g., by using processing power, storage, battery life, etc.) when encrypting or decrypting data.

For these reasons, there exists a need for an integrated solution that allows a user to utilize a universal encryption key across multiple devices without overly burdening any user devices.

BRIEF SUMMARY

Some embodiments provide a way for a user to backup data from any of a variety of user devices to a destination storage (or "remote" storage). The data may, in turn, be restored to various devices from the destination storage, as desired by the user. Some embodiments compress and encrypt data before it is sent to the destination storage. In some of these embodiments, the compression and encryption are performed at an intermediate processing module such that the user device is not overburdened. Similarly, some embodiments decompress and decrypt data when it is restored from the destination storage. Some of these embodiments perform the decryption and decompression at the intermediate processing module, to conserve resources of the user device.

A way for the user to establish a secure communication channel when backing up or restoring data may be provided by some embodiments. Some of these embodiments allow a user to select a private key that is used for universal data encryption. A user may initially select a private key and then may be required to enter the private key every time the user wishes to access data associated with the user's account from certain user devices. Alternatively, a default key may be used if the user does not wish to create and/or utilize the private key. In either case, the private key or default key may be used among all user devices, but may not be passed (either directly or after encryption) among the user devices, intermediate processing module, and/or destination storage.

Some embodiments provide a seamless method for remotely storing user data having uniform encryption among a plurality of devices. The method may include opening a first secure communication channel between a user device and an intermediate processing module, receiving user account information from the user device over the secure communication channel for temporary use, wherein the user account information includes at least a user account encryption key, receiving user data for remote storage from the user device, encrypting the user data at the intermediate processing module using the received user account encryption key, opening a second secure communication channel between the intermediate processing module and a destination storage, wherein the communication channel is opened after authentication of a user account using the received account information, transferring the encrypted user data to the destination storage, and removing the user account information from the intermediate processing module.

Some embodiments provide a method of opening a secure communication channel for access to a remote server from a user device associated with a user. The method may include encoding a set of user account information using a private encryption key, generating a concatenated string that includes the encoded set of user account information, encrypting the concatenated string using a shared encryption key that is based at least partly on a dynamic string, and sending the encrypted concatenated string to the remote server for authentication.

Some embodiments provide a method of opening a communication channel between a remote storage and a user device associated with a user. The method may include receiving an encrypted concatenated string from the user device for authentication, wherein the encrypted concatenated string includes at least some user account information that is encrypted using a user account encryption key, decrypting the encrypted concatenated string using a shared encryption key that is generated using a dynamic string, and retrieving a set of user account information from the decrypted string for authenticating user access.

The preceding Summary is intended to serve as a brief introduction to some embodiments of the invention. It is not meant to be an introduction or overview of all inventive subject matter disclosed in this document. The Detailed Description that follows and the Drawings (or "Figures" or "FIGS.") that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matter is not to be limited by the illustrative details in the Summary, Detailed Description and the Drawings, but rather is to be defined by the appended claims, because the claimed subject matter may be embodied in other specific forms without departing from the spirit of the invention.

BRIEF DESCRIPTION OF THE DRAWINGS

The novel features of the invention are set forth in the appended claims. However, for purpose of explanation, several embodiments of the invention are set forth in the following drawings.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Several more detailed embodiments of the invention are described in the sections below. Section I provides a conceptual overview of the system used to implements some embodiments. Section II describes the software architecture used in some embodiments. Section III then describes data backup of some embodiments. Next, Section IV describes data restoration of some embodiments. Section V then describes initial user account creation in some embodiments. Section VI then describes the process used to define the media editing application of some embodiments. Lastly, Section VII describes a computer system which implements some of the embodiments of the invention.

I. System Overview

Figure 1:
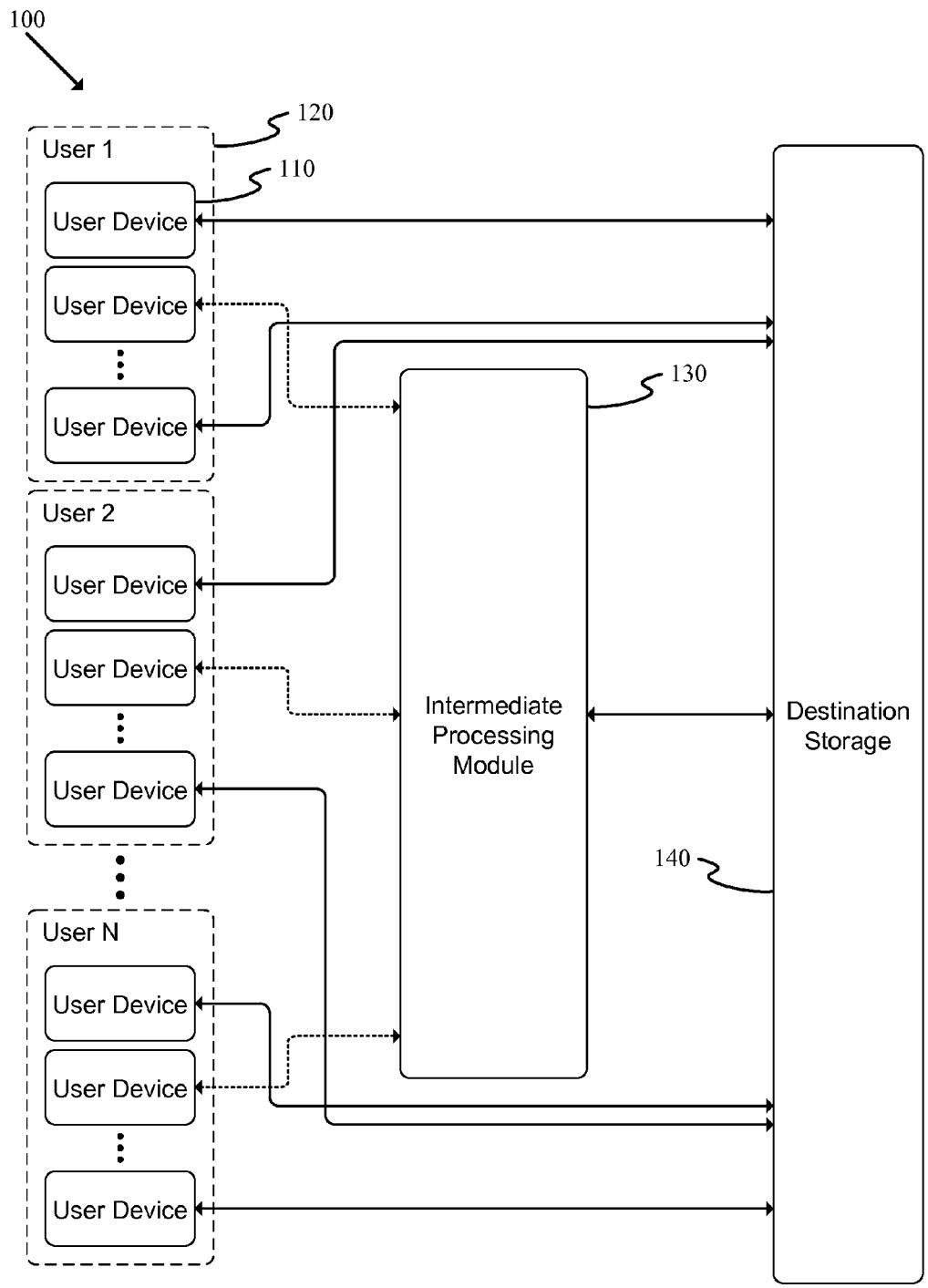
FIG. 1 illustrates a schematic diagram of a conceptual system adapted to backup user data at a destination storage of some embodiments.

FIG. 1 illustrates a schematic diagram of a conceptual system 100 adapted to backup user data at a destination storage of some embodiments. Specifically, this figure illustrates data pathways among various components (e.g., devices, modules, storage elements, etc.) of the system. As shown, the system 100 may include various user devices 110, each user device associated with a user 120, an intermediate processing module 130, and a destination storage 140.

The user 120 may be any entity that is able to control, access, and/or communicate with one or more user devices. The user device 110 may be any electronic device adapted to access, store and/or process data. Such user devices may include various different types of devices (e.g., Smartphones, personal computers, laptops, tablets, etc.). In addition, the user devices may operate on various different platforms (e.g., Windows, Mac OS X, Linux, etc.). Furthermore, the user devices may be adapted to communicate using various different protocols (e.g., 3G, 4G, 3GPP Long Term Evolution or "LTE", Ethernet, Internet Protocol or "IP", etc.) and/or communications systems (e.g., a cellular network, a local area network such as a wireless network, a network of networks such as the Internet, etc.).

The intermediate processing module 130 may be adapted to compress and/or encrypt (and/or decompress and/or decrypt) data before sending (and/or after receiving) data to (and/or from) destination storage device 140. The destination storage 140 may be adapted to receive data from various user devices 110 and/or one or more intermediate processing modules 130, store such received data, and send data to one or more intermediate processing modules 130 and/or various user devices 110.

As shown in FIG. 1, some user devices 110 may communicate directly with the destination storage 140. Such "direct" communication may include various devices, data interfaces, communication systems, etc. Although some user devices 110 are shown as not communicating directly with the destination storage 140, some embodiments allow all devices to communicate directly with the destination storage regardless of whether the devices also communicate with the intermediate processing module 130.

If the user device 110 has sufficient capability (e.g., computing and/or processing power) to compress and/or encrypt the data to be stored, the compressed and/or encrypted data may be sent directly to the destination storage 140. If the user device 110 has insufficient capability, data may be sent from the user device 110 to the intermediate processing module 130 where the data may be compressed and/or encrypted. The compressed and/or encrypted data may in turn be sent from the intermediate processing module 130 to the destination storage 140. In this way, a user device 110 with insufficient processing capability may not be unnecessarily loaded during backup or restoration of data. In some cases, although a particular user device may be "capable" of processing the data (e.g., compressing and encrypting or decrypting and decompressing) locally, the processing may still be offloaded to the intermediate processing module (e.g., to extend battery life of the user device, to allow the user device to perform other tasks, etc.).

When restoring data from the destination storage 140, data may be sent from the destination storage 140 directly to a user device 110. Data may or may not pass through the intermediate processing module 130, as appropriate (e.g., based on the processing capability of the user device). Data backed up on the destination storage device 140 may be restored to any user device (i.e., data may be restored to a different user device than the device from which the data originated). In this way, a user 120 may backup and/or restore data among several different user devices, devices operating on various different platforms, etc.

In some embodiments, some or all communication pathways may utilize secure, encrypted channels. In addition, as described above, the data sent over the channels may be encrypted before being sent or at the intermediate processing module.

One of ordinary skill in the art will recognize that the conceptual system 100 may be implemented in various different ways without departing from the spirit of the invention. For instance, although the intermediate processing module 130 and destination storage 140 have been represented as separate entities, they may be implemented on a single device (e.g., a remote server). In addition, although various communication pathways may be represented as direct connection (e.g., from the user device to the destination storage), one of ordinary skill in the art will recognize that the pathways may include various signal pathways (e.g., wireless, wired, etc.), devices (e.g., cellular communication towers, routers, etc.), connections, etc.

Figure 2:
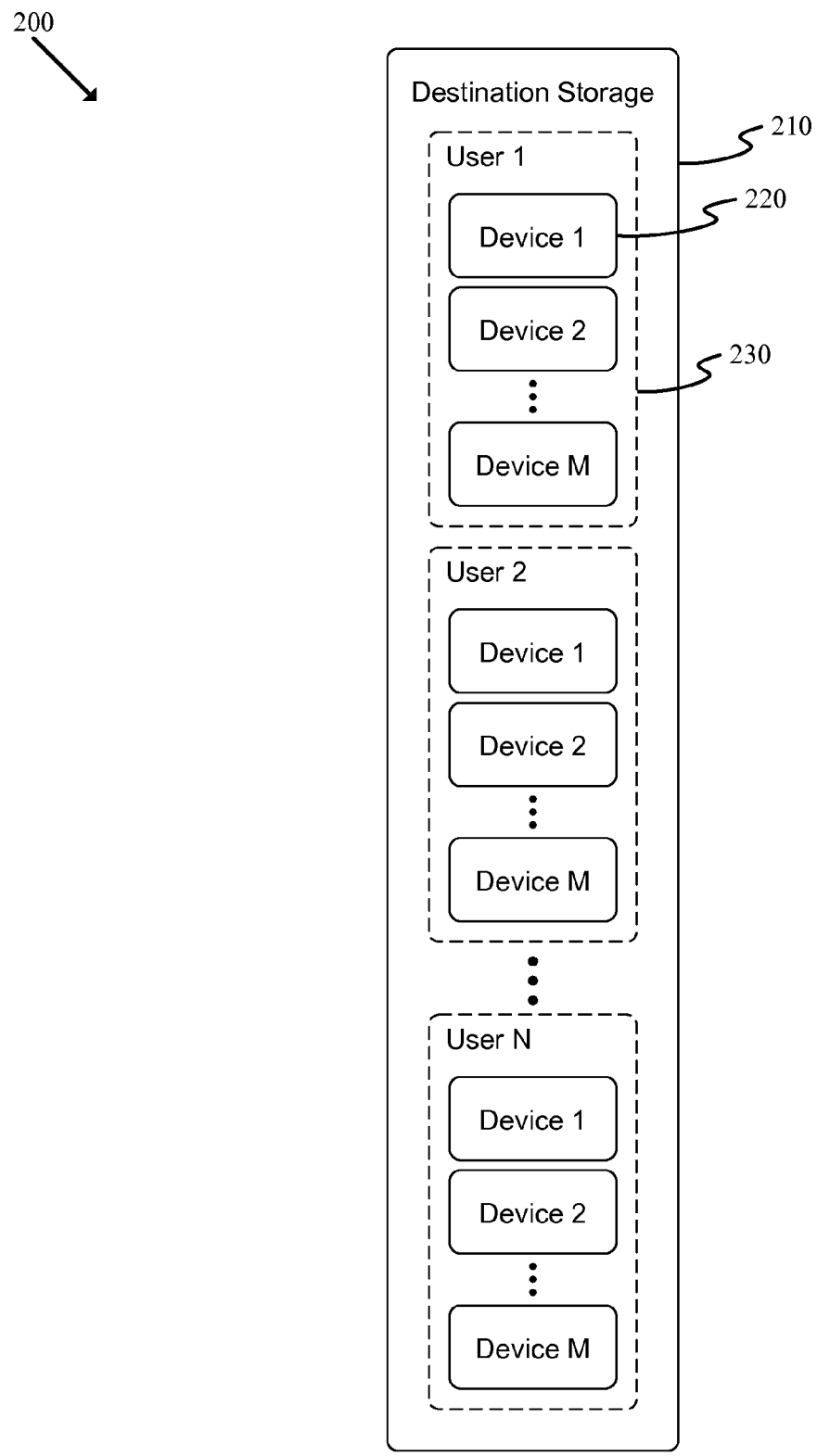
FIG. 2 illustrates a data structure diagram showing a conceptual organization of data used by some embodiments.

FIG. 2 illustrates a data structure diagram showing a conceptual organization of data 200 used by some embodiments. Specifically, this figure illustrates the top-level organization of user data residing on the destination storage 210. As shown, the destination storage (e.g., the destination storage 140 described above in reference to FIG. 1) may include a set of folders 220, each folder associated with a particular user device (e.g., the user devices 110 described above in reference to FIG. 1). As shown in FIG. 2, each folder 220 may be adapted to store data associated with a particular user device. In addition, each user device folder 220 may be associated with a particular user 230.

During operation, the data organization 200 may allow various entities (e.g., users, applications, etc.) to efficiently and easily access data. In addition, whichever entities may access the data may be able to determine the source of the data, and act accordingly when appropriate. For instance, in some embodiments data uploaded from a first device may be restored to a second device. In such cases, it may be desirable to format or otherwise present the data such that the second device is able to use the data as needed.

II. Software Architecture

Figure 3:
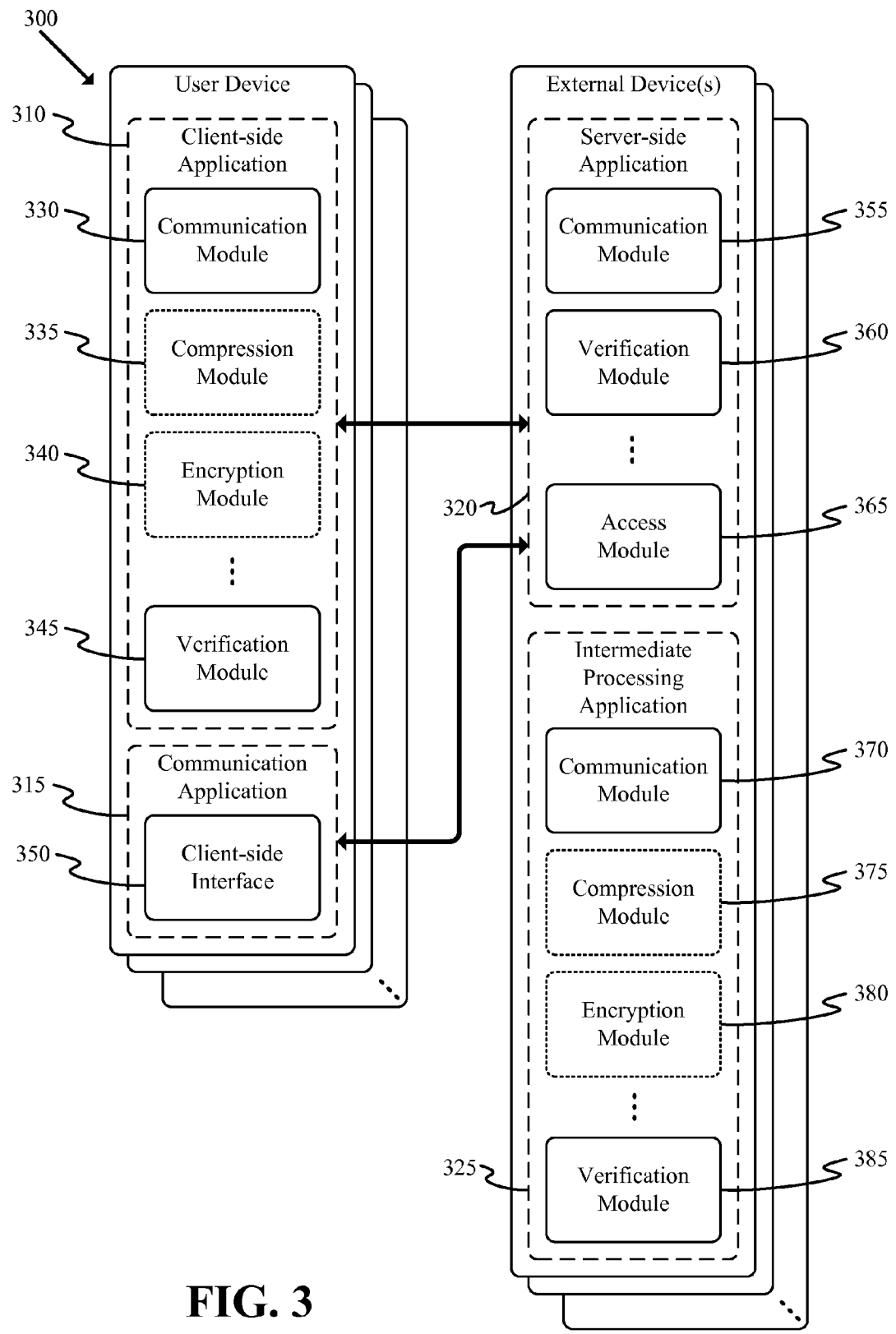
FIG. 3 illustrates a schematic diagram of a conceptual software architecture of some embodiments.

FIG. 3 illustrates a schematic diagram of a conceptual software architecture 300 of some embodiments. Specifically, the figure shows various operational modules that may be included in a client-side application 310 and a communication application 315 running on a user device, a server-side application 320 running on one or more external devices (e.g., a server), and an intermediate processing application 325 running on one or more external devices. Although the server-side application 320 and the intermediate processing application 325 are represented as being included on a single external device, one of ordinary skill will recognize that the applications may be implemented using various appropriate combinations of external devices (e.g., the server-side application may run on a single server, the intermediate processing application may run on multiple processing devices external to the server, etc.). The client-side, communication, and server-side applications may include various sets of instructions that are able to be executed by a user device and/or one or more external devices, either conjunctively or separately.

As shown, the client-side application 310 may include a communication module 330, a compression module 335, an encryption module 340, a verification module 345, and/or other modules (not shown). The communication application 315 may include a client-side interface 350, and/or other modules (not shown). The server-side application 320 may include a communication module 355, a verification module 360, an access module 365, and/or other modules (not shown). The intermediate processing application 325 may include a communication module 370, a compression module 375, an encryption module 380, a verification module 385, and/or other modules (not shown).

The client-side application 310 may be adapted to allow a user device to seamlessly communicate with, access, and/or otherwise utilize the destination storage (and/or the intermediate processing module) provided by some embodiments. Such a client-side application may be installed on multiple user devices of various types (e.g., Smartphone, PC, etc.). The communication module 330 may be adapted to facilitate communication between the user device and one or more external devices that execute the server-side application 320. The compression module 335 may be adapted to compress and/or decompress data. The encryption module 340 may be adapted to uniformly encrypt and/or decrypt data (e.g., by encrypting and/or decrypting data using a single encryption key across multiple devices). The verification module 345 may be adapted to generate various data that may be authenticated by the server-side application 320 and/or the intermediate processing application 325. In addition, the verification module may be adapted to evaluate authentication data generated by the server-side application 320 and/or the intermediate processing application 325.

The communication application 315 (e.g., a web browser, plug-in, platform, etc.) may likewise allow the user device to communication with, access, and/or otherwise utilize the destination storage (and/or the intermediate processing module) provided by some embodiments. In this example, a client-side interface 350 runs on the communications application 315. The client-side interface 350 may include similar modules and functionality as the client-side application 320 described above. In this way, users may be able to access the destination storage from various devices without having to install any system-specific software.

The client-side application 310 and the communication application 315 with client-side interface 350 may utilize commonly available protocols, architectures, and/or communication mediums. For instance, some embodiments may utilize hypertext transfer protocol secure ("HTTPS") calls, representational state transfer ("REST") application programming interfaces ("APIs"), etc. Such utilization may allow the source device to avoid using processing power, as the processing is done elsewhere.

The server-side application 320 may be adapted to communicate with various user devices (and/or applications) and allow such devices (and/or applications) to access and/or otherwise utilize the destination storage (and/or intermediate processing module). The communication module 355 may be adapted to facilitate communication among one or more external devices that execute the server-side application 320 and a user device running the client-side application 310. The verification module 360 may be adapted to generate various data that may be authenticated by the client-side application. In addition, the verification module may be adapted to evaluate authentication data generated by the client-side application. The access module 365 may be adapted to provide access to the destination storage (and/or intermediate processing module) once the user device (and/or client-side application) has been verified.

The server-side application 320 may be implemented using various combinations of external devices. For instance, some embodiments may implement the server-side application using a single device (e.g., a server). As another example, some embodiments may implement the server-side application using multiple devices communicatively coupled over a network. In addition, the server-side application may be able to access various external devices (such as storages), as appropriate. For instance, data may be stored redundantly (e.g., the same data may be stored in multiple storages), may be distributed (e.g., the data may be partitioned into sub-sets, with the sub-sets being stored among the multiple storages), and/or stored in other appropriate ways.

The intermediate processing application 325 may be adapted to communicate with various user devices (and/or applications) and/or a destination storage (and/or server-side application) provided by some embodiments. The communication module 370 may be adapted to facilitate communication among one or more external devices that execute the server-side application 320 and a user device running the client-side application 310. The compression module 375 may be adapted to compress and/or decompress data. The encryption module 380 may be adapted to encrypt and/or decrypt data. The verification module 385 may be adapted to generate various data that may be authenticated by the client-side and/or server-side applications. In addition, the verification module may be adapted to evaluate authentication data generated by the client-side and/or server-side applications.

The operation of system 300 will be described below in reference to FIGS. 4-19.

One of ordinary skill in the art will recognize that the conceptual architecture 300 may be implemented in various different ways without departing from the spirit of the invention. For instance, the client device may include a user interface (UI) module that may be adapted to allow a user to select data to backup, data to download, and/or otherwise control the operation of the client-side application. In addition, although various modules have been represented as separate blocks, they may be combined into a single block in some embodiments (e.g., the compression and encryption modules may be combined into a single module, the communication and verification modules may be combined into a single module, etc.). Furthermore, various modules shown as single blocks may be separated into separate modules, as appropriate (e.g., the communication module may be separated into multiple modules, each adapted to a specific network or protocol, etc.). Moreover, different embodiments may distribute the various modules in different ways (e.g., the server-side application may include modules such as a compression or encryption module on an intermediate processing device, a verification module on a destination storage device, and a communication module with elements distributed among the devices).

III. Data Backup

Figure 4:
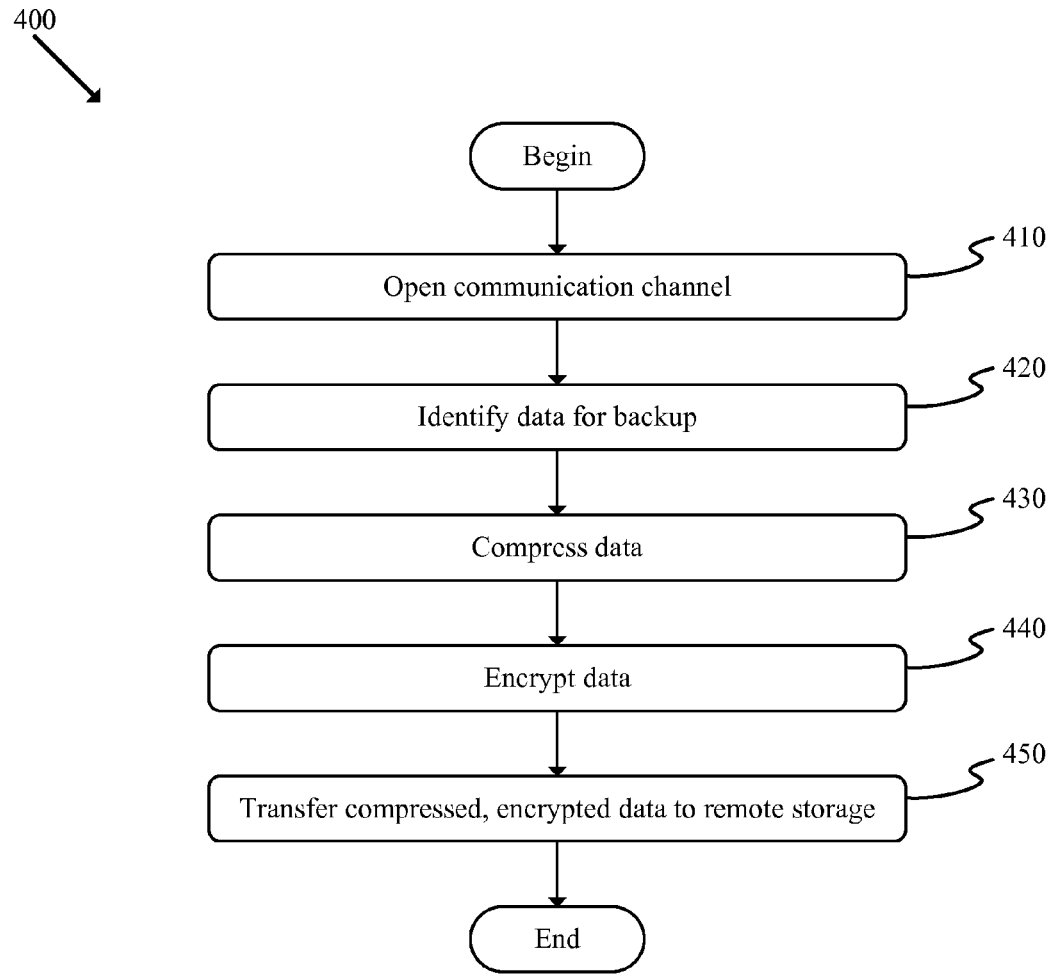
FIG. 4 illustrates a flow chart of a conceptual process used by some embodiments to seamlessly upload (or backup) data from a user device to a destination storage.

FIG. 4 illustrates a flow chart of a conceptual process 400 used by some embodiments to upload (or backup) data from a user device to a destination storage. The process may begin, for example, when a user launches the client-side application of some embodiments, when the user selects data to be backed up to the destination storage, at other appropriate times, and/or based on other events. For instance, in some embodiments data may be automatically backed up at regular intervals (e.g., hourly, daily, monthly, etc.) which may be based on system defaults and/or user preferences. As another example, in some cases data may be backed up any time there is a change in associated data on a user device (e.g., backup may be initiated when a user creates a new file, edits a previously backed-up file, modifies the contents of a previously backed-up folder, etc.).

Next, process 400 may open (at 410) a communication channel. Opening the channel may require various specific operations depending on the type of user device (e.g., Smartphone, PC, etc.), the connection employed (e.g., wireless, cellular, etc.), and/or other relevant factors. The communication channel may include hardware elements (e.g., wired connections, antennas, servers, etc.) and/or software elements (e.g., APIs, data transfer protocols, etc.). The communication channel may be opened by components such as the communication modules 330, 355, 370 and/or verification modules 345, 360, 385 described above in reference to FIG. 3. The communication channel may connect various components or devices, as appropriate (e.g., the user devices 110, intermediate process module 120, and/or destination storage 130 described above in reference to FIG. 1). Opening such a channel will be described in more detail in reference to FIGS. 5 and 6 below.

Process 400 may then identify (at 420) data for backup. The data may be identified in various appropriate ways. Such identification may be based on information provided by a user (e.g., a user may select specific files or folders for backup using a UI provided by the client-side application) and/or other factors (e.g., backup of a folder that has been set up to occur at regular intervals). In some cases, changes to files or folders that have been previously selected for backup will be automatically applied. In addition, some embodiments may upload only the data that has changed (e.g., a file may include multiple blocks of data, where only a subset have been updated, resulting in only a subset of the blocks being uploaded rather than the entire file).

Next, the process may compress (at 430) the data selected for backup. Such compression may reduce the amount of storage needed for a user's data, and may also reduce the load on other operations (e.g., encryption). The compression may be performed in various ways using various different compression algorithms. Such compression may, for instance, be performed by a component such as the compression module 335 or 375 described above in reference to FIG. 3.

The process may then encrypt (at 440) the compressed data. Such encryption may be performed in various appropriate ways using various appropriate encryption algorithms. The encryption may be performed using a private or default key, as described below in reference to processes 500 and 600.

Finally, process 400 may transfer (at 450) the compressed, encrypted data to the destination storage and then end. Such transfer may use various secure communications pathways and protocols, as appropriate. The compression, transfer, and encryption of data will be described in more detail in reference to FIGS. 7-10 below.

One of ordinary skill in the art will recognize that process 400 may be performed in various appropriate ways without departing from the spirit of the invention. For instance, the process may not be performed as one continuous series of operations in some embodiments. In addition, the process may be implemented using several sub-processes, or as part of a larger macro-process. Furthermore, various processes may be performed concurrently, sequentially, or some combination of sequentially and concurrently (e.g., certain operations of a first process may be performed concurrently with certain operations of a second process, while other operations of the first process may need to be completed before continuing to other operations of the second process). Moreover, the operations of the process may be performed in different orders.

Figure 5:
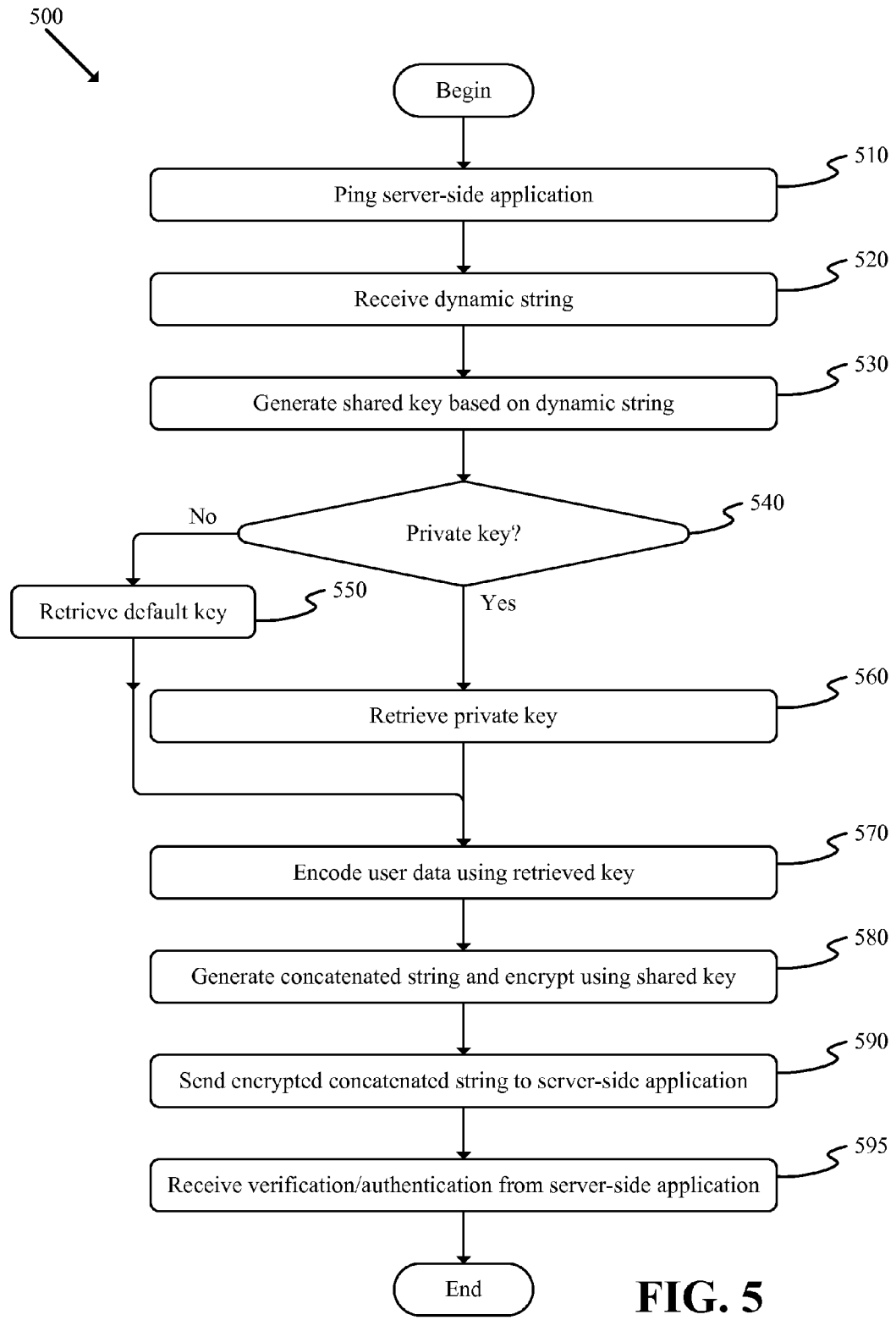
FIG. 5 illustrates a flow chart of a conceptual process used by some embodiments to open a communication channel.

FIG. 5 illustrates a flow chart of a conceptual process 500 used by some embodiments to open a communication channel (e.g., operation 410 described above in reference to process 400). Specifically, the figure illustrates the client-side perspective when opening a communication channel. The process may be performed, for instance, by the client-side application 310 described above in reference to FIG. 3. Process 500 may begin, for example, when a user launches the client-side application, when a user selects data for backup, at appropriate intervals, etc.

Next, the process may "ping" (at 510) a server-side application (e.g., server-side application 320 described above in reference to FIG. 3). Such a ping may be any request for authorization that is able to be received and recognized at the server-side application. The process may then receive (at 520) a dynamic string of data. The dynamic string may, for instance, include data such as timestamp data (e.g., month, day, year, hour, minutes, seconds, etc.) and/or other appropriate data (e.g., data related to the user device, data related to the destination storage, etc.).

Process 500 may generate (at 530) a shared encryption key, where the shared encryption key is at least partly based on the dynamic string. In some embodiments, the shared key may be generated using "salt" cryptography. Such cryptography may be used to generate a key from a set of random bits and a supplied password (in this case, the supplied password may include the dynamic string). Next, the process may determine (at 540) whether there is a private key. Such a private key may be generated by a user when the user initially sets up an account with the destination storage service. Some embodiments may require the user to enter the private key every time the user attempts to access the destination storage (e.g., the user may be provided with a login screen that may include fields such as username, password, and private key). Such account generation will be described below in reference to FIG. 19.

If the process determines (at 540) that there is not a private key, the process may retrieve (at 550) a default key. The default key may be available to the client-side application and the server-side application. If the process determines (at 540) that a private key is available, the process may retrieve (at 560) the private key. In either case (whether a default key or a private key is used), the key may not be transferred between the client-side application and the server-side application. After retrieving (at 550 or 560) the appropriate key, process 500 may encode (at 570) user data (e.g. username and password associated with the user that is using the client-side application to access the destination storage) using the retrieved key. Such encoding may be performed using various appropriate tools, algorithms, etc. (e.g., base 64 encoding).

Next, the process may generate and encrypt (at 580) a concatenated string. The concatenated string may include the user data, the encoded user data, a flag indicating whether a private or default key is used for encryption, and/or other appropriate flags and/or data. The concatenated string may be encrypted (at 580) at the client-side using the shared key generated at 530 and appropriate algorithms. Such encryption may use the shared key to transform (e.g., lock) data into an unreadable form, that requires the same shared key to transform the data into a readable form.

Once the concatenated string is encrypted, the process may send (at 590) the encrypted concatenated string to the server-side application. The process then may receive (at 595) verification/authentication from the server-side application (if the supplied information has been verified as correct at the server-side application) or the request to establish communication may be denied (if the supplied information is determined to be incorrect at the server-side application) and the process ends.

One of ordinary skill in the art will recognize that process 500 may be performed in various appropriate ways without departing from the spirit of the invention. For instance, the process may not be performed as one continuous series of operations in some embodiments. In addition, the process may be implemented using several sub-processes, or as part of a larger macro-process. Furthermore, various processes may be performed concurrently, sequentially, or some combination of sequentially and concurrently. Moreover, the operations of the process may be performed in different orders.

Figure 6:
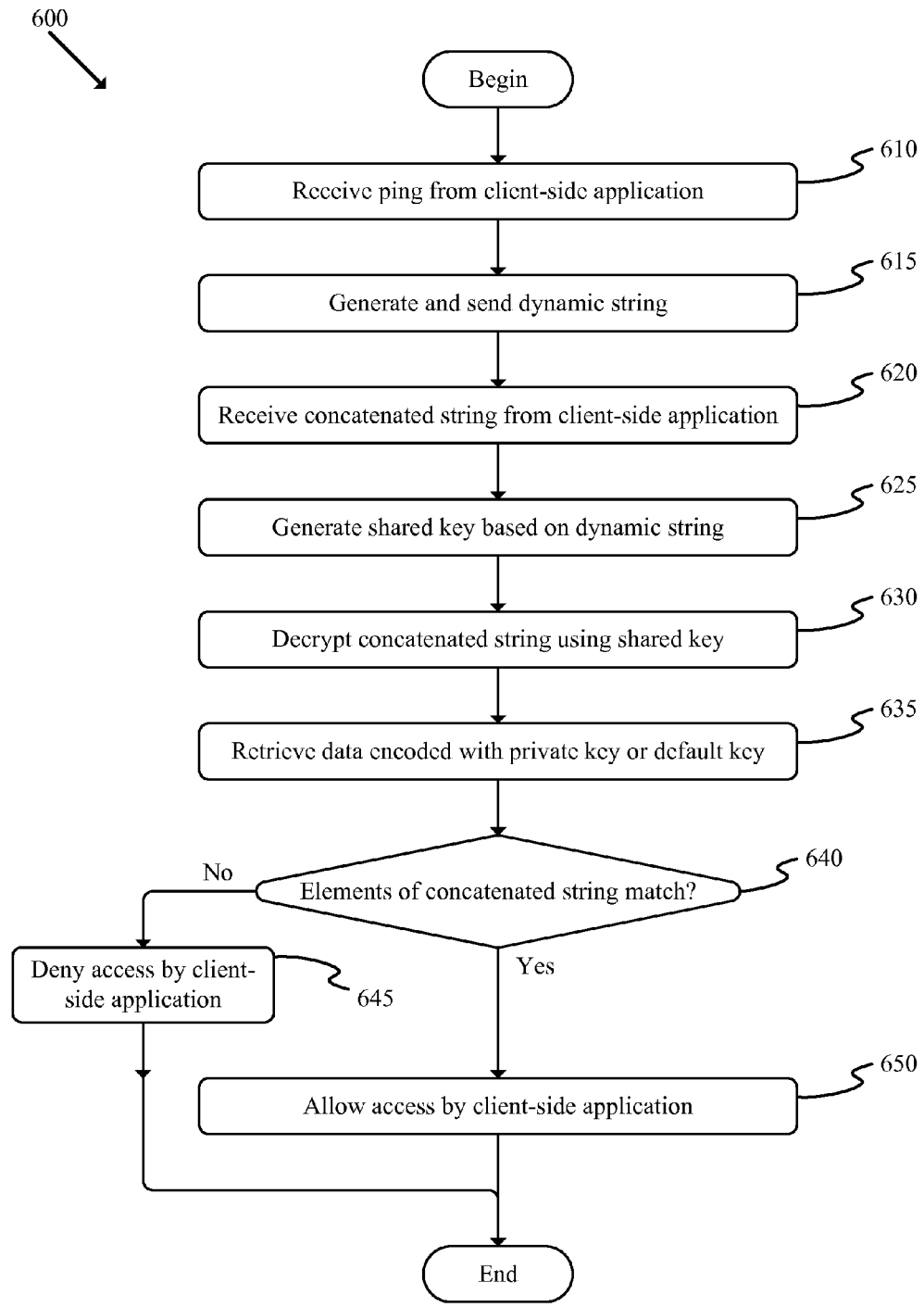
FIG. 6 illustrates a flow chart of a conceptual process used by some embodiments to open a communication channel.

FIG. 6 illustrates a flow chart of a conceptual process 600 used by some embodiments to open a communication channel (e.g., operation 410 described above in reference to process 400). Specifically, the figure illustrates the server-side perspective when opening a communication channel. The process may be performed, for instance, by the server-side application 320 described above in reference to FIG. 3. Process 600 may be performed in conjunction with process 500 (i.e., the server-side application and client-side application may operate in conjunction to open a communication channel between the two). Process 600 may begin, for instance, when a client-side application attempts to access data on the destination storage, when a user selects data for backup, at appropriate intervals, etc.

Next, the process may receive (at 610) a ping from the client-side application (or other appropriate application, device, etc.). Such a ping may be any request that is able to be received and recognized by the server-side application. The process may then generate and send (at 615) a dynamic string to the client-side application. The dynamic string may be the same dynamic string described above in reference to operation 520 of process 500. Thus, both the server-side application and client-side application may have access to the same dynamic string.

Returning to process 600, the process may then receive (at 620) a concatenated string from the client-side application. Next, the process may generate (at 625) a shared key based at least partly on the dynamic string generated at 615. As above, the shared key generated may be a salt key. By using the same algorithm to generate the key as that used in operation 530 described above in reference to process 500, the client-side and server-side application may have access to the same shared key (i.e., a key including the same data as a key at the other application). In this way, the client-side and server-side applications may be able to share the same key without having to expose the key during communication.

Process 600 may then decrypt (at 630) the concatenated string using the shared key. Such decryption may be performed using a decryption algorithm that is complementary to the encryption algorithm used in operation 580 described above in reference to process 500.

Next, process 600 may retrieve user data encoded with the private or default key, as appropriate. Such encoded data may have been generated, for instance, when the user created an account, as described below in reference to FIG. 19. Thus the encoded data may have been included in a previous concatenated string (or other appropriate form) that is available to the server-side application.

Next, the process may determine (at 640) whether the elements of the concatenated string match the data previously provided to the server (e.g., username, password, user data encoded with the private or default key, etc.). If the elements of the string do not match, the process may deny (at 645) the client-side application access to data stored on the remote server. If the elements of the string do match, the process may allow (at 650) the client-side application access to the data. Such denial or allowance may include sending a particular message or signal to the client-side application to indicate that the client-side application is authorized to access the resources provided by the server-side application. After indicating the denial or allowance, the process ends.

One of ordinary skill in the art will recognize that process 600 may be performed in various appropriate ways without departing from the spirit of the invention. For instance, the process may not be performed as one continuous series of operations in some embodiments. In addition, the process may be implemented using several sub-processes, or as part of a larger macro-process. Furthermore, various processes may be performed concurrently, sequentially, or some combination of sequentially and concurrently. Moreover, the operations of the process may be performed in different orders (e.g., the shared key may be generated before the concatenated string is received).

Figure 7:
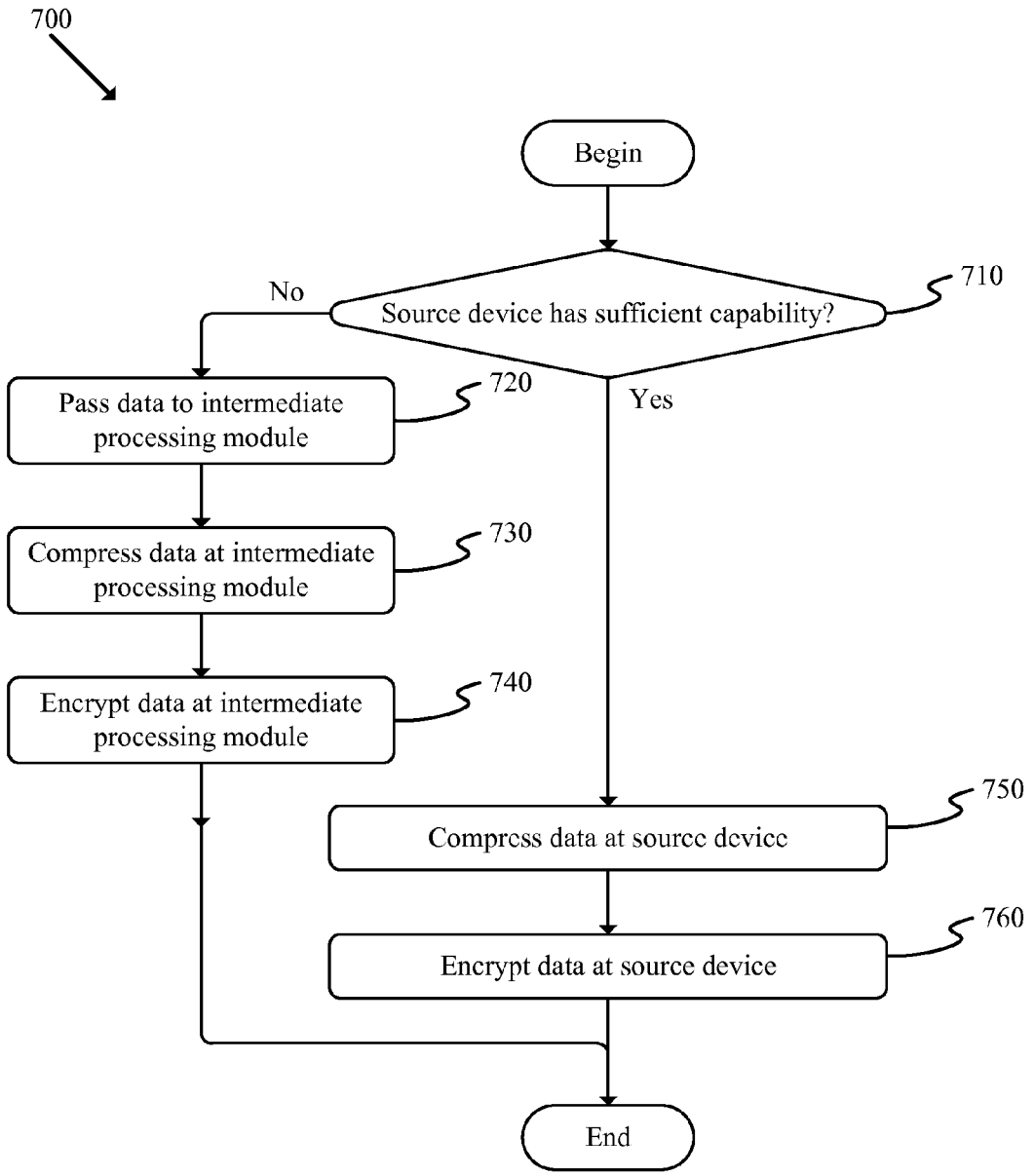
FIG. 7 illustrates a flow chart of a conceptual process used by some embodiments to compress and universally encrypt data to be stored at the destination storage.

FIG. 7 illustrates a flow chart of a conceptual process 700 used by some embodiments to compress and encrypt data to be stored at the destination storage (e.g., operations 420-430 described above in reference to process 400). Specifically, the figure illustrates that compression and encryption of data may occur at a source device (e.g., a user device) or an intermediate processing module. Process 700 may be performed by, for instance, the client-side application 310 or server-side application 320 described above in reference to FIG. 3, as appropriate.

Process 700 may begin, for instance, after a communication channel has been opened between the client-side application and the server-side application. The process may then determine (at 710) whether the source device is capable of compressing and/or encrypting data. Such a determination may be made by the client-side application in some embodiments. The determination may be based on various relevant factors such as, for instance, whether the source device has sufficient computing power, processing power, storage, battery life, etc. In some cases, a particular source device may be technically capable of compressing and/or encrypting data but may still pass the data to an intermediate processing module (e.g., to extend battery life of the source device, to allow the source device to perform other tasks, to avoid affecting other operations of the source device, etc.).

If the source device does not have sufficient capability, the data may be passed (at 720) to an intermediate processing module (e.g., module 130 described above in reference to FIG. 1). The data may be securely passed using channel encryption, with, for example, a secure socket layer (SSL) connection between the source device and the intermediate processing module.

The data may then be compressed (at 730) at the intermediate processing module. Such compression may utilize various appropriate tools and/or algorithms (e.g., lossless data compression algorithms, hypertext transfer protocol or "HTTP" compression, etc.) to encode the data using fewer bits than the uncompressed representation. The data may then be encrypted (at 740) at the intermediate processing module. Encryption may utilize various appropriate algorithms and/or tools (e.g., Advanced Encryption Standard or "AES", symmetric key block ciphers such as "Serpent", etc.). In some embodiments, the data may be encrypted using the private or default key described above in reference to processes 500 and 600, as appropriate.

If process 700 determines (at 710) that the source device has sufficient processing capability, the data may be compressed (at 750) at the source device. The compressed data may then be encrypted (at 760) at the source device. As above, the encryption and compression may be performed using various appropriate algorithms and/or tools. The compression and/or encryption (at the source device or the intermediate processing module) may be performed block-by-block, or a whole file (or folder) may be encrypted. In addition, the encryption may be accomplished using the private or default key described. After encrypting (at 740 or 760) the data, process 700 ends.

One of ordinary skill in the art will recognize that process 700 may be performed in various appropriate ways without departing from the spirit of the invention. For instance, the process may not be performed as one continuous series of operations in some embodiments. In addition, the process may be implemented using several sub-processes, or as part of a larger macro-process. Furthermore, various processes may be performed concurrently, sequentially, or some combination of sequentially and concurrently. Moreover, the operations of the process may be performed in different orders.

Figure 8:
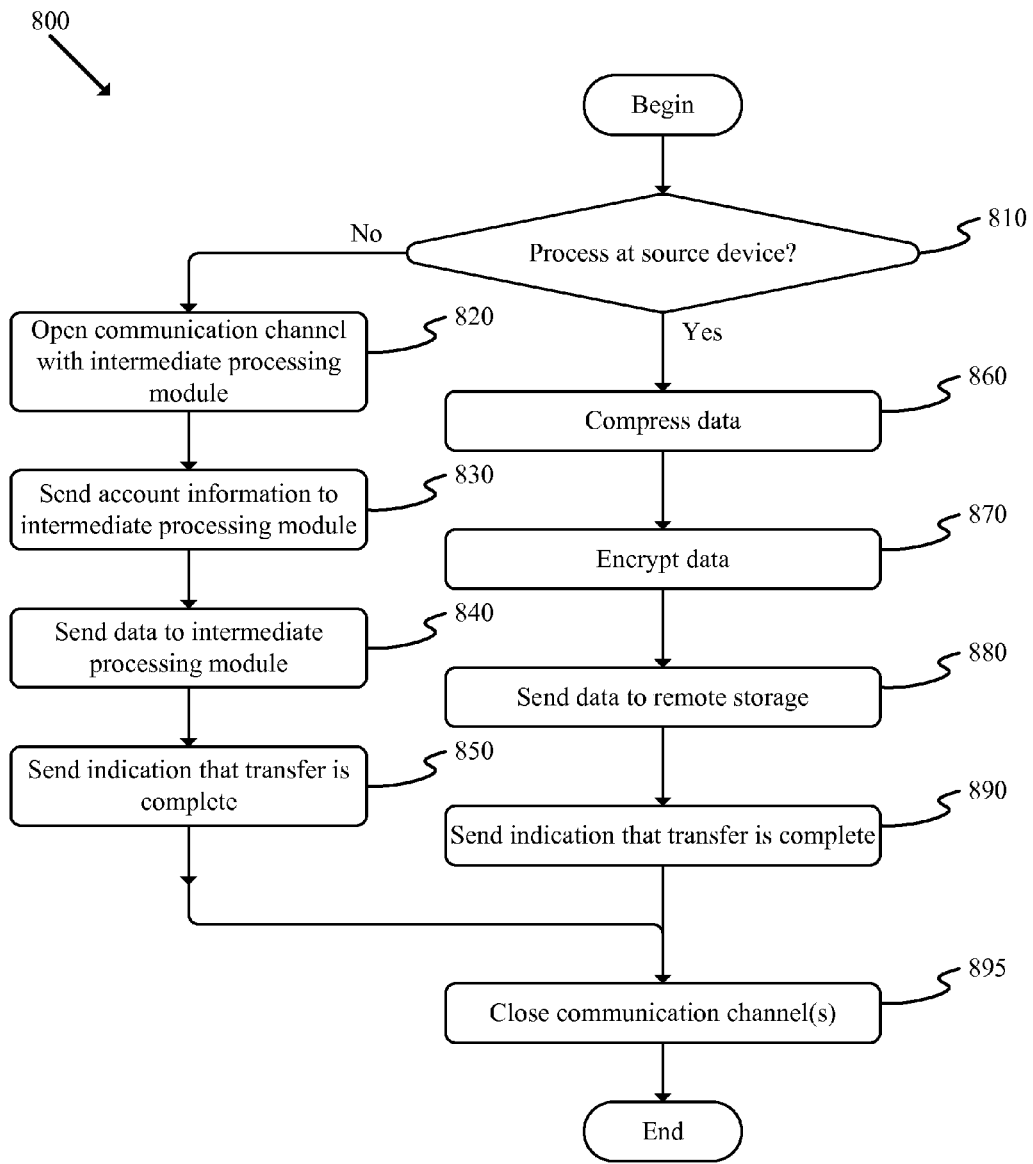
FIGS. 8-10 illustrate flow charts of conceptual processes used by some embodiments to upload (or backup) data once a communication channel has been opened.

FIG. 8 illustrates a flow chart of a conceptual process 800 used by some embodiments to upload (or backup) data once a communication channel has been opened (e.g., operations 430-450 described above in reference to process 400). Specifically, the figure illustrates the client-side perspective when transferring data over an open communication channel. The process may be performed, for instance, by the client-side application 310 described above in reference to FIG. 3.

Process 800 may begin, for instance, when a communication channel has been opened as described above in reference to FIGS. 5 and 6. Process 800 may then determine (at 810) whether the data will be processed at the source device. The determination may be made as described above in reference to FIG. 7. If process 800 determines that the data will not be processed at the source device (i.e., when the data will be processed at the intermediate processing module), the process may open (at 820) a communication channel with the intermediate processing module. Such a channel may be opened in a similar manner to that described above in reference to FIGS. 5 and 6. Next, the process may send (at 830) account information to the intermediate processing module. The account information may include the private or default key, user data (e.g., user name and password), and/or other data (e.g., various flags, information regarding the user device, etc.).

The process may then send (at 840) data to the intermediate processing module. Such data may be sent block-by-block, as a complete file (or folder), etc. Next, the process may send (at 850) an indication that the transfer of data is complete.

If process 800 determines (at 810) that the data will be processed at the source device, the process may compress (at 860) the data at the source device. The process may then encrypt (at 870) the data at the source device. Next, the process may send (at 880) the data from the source device to the destination storage. Such data may be sent, for instance, over the previously-opened communication channel. The process may then send (at 890) an indication that the transfer is complete.

Finally, after sending (at 850 or 890) an indication that the transfer is complete, the process may close (at 895) any open communication channel(s). Alternatively, the channel(s) may be left open to allow transfer of additional data (e.g., when transferring multiple files or folders at one time).

One of ordinary skill in the art will recognize that process 800 may be performed in various appropriate ways without departing from the spirit of the invention. For instance, the process may not be performed as one continuous series of operations in some embodiments. In addition, the process may be implemented using several sub-processes, or as part of a larger macro-process. Furthermore, various processes may be performed concurrently, sequentially, or some combination of sequentially and concurrently. Moreover, the operations of the process may be performed in different orders.

Figure 9:
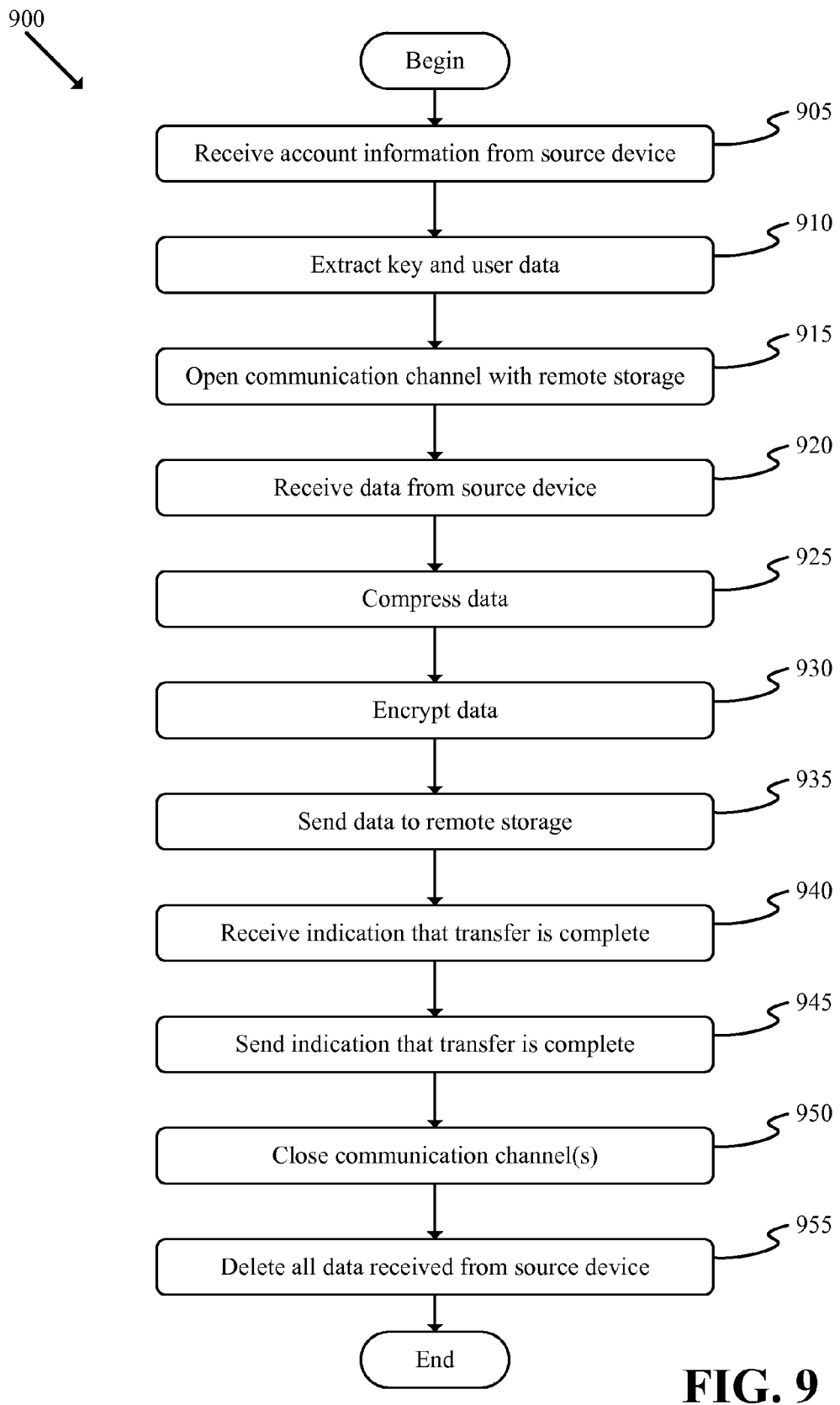

FIG. 9 illustrates a flow chart of a conceptual process 900 used by some embodiments to upload (or backup) data once a communication channel has been opened (e.g., operations 430-450 described above in reference to process 400). Specifically, the figure illustrates the intermediate processing module perspective when transferring data over an open communication channel. The process may be performed, for instance, by the server-side application 320 described above in reference to FIG. 3.

Process 900 may begin, for instance, when a communication channel has been opened as described above in reference to operation 820 of process 800. Process 900 may then receive (at 905) account information from the source device. The account information may include the private or default key, user data (e.g., user name and password), and/or other data (e.g., various flags, information regarding the user device, etc.). The process may then extract (at 910) the key, user data, and/or other data, as appropriate, from the concatenated string. Next, the process may open (at 915) a communication channel with the destination storage. Such a channel may be opened in a similar manner to that described above in reference to FIGS. 5 and 6.

The process may then receive (at 920) data from the source device. Such data may be received block-by-block, as a complete file (or folder), and/or other appropriate ways. Next, the process may compress (at 925) and encrypt (at 930) the data. The process may then send (at 935) the compressed, encrypted data to the destination storage. Next, the process may receive (at 940), from the source device, an indication that the transfer is complete. Process 900 may, in turn, send (at 945), to the destination storage, an indication that the transfer is complete. Next, the process may close (at 950) any open communication channels. As above, the channel(s) may alternatively be left open to allow transfer of additional data (e.g., when transferring multiple files or folders at one time).

The process may then delete (at 955) all data received from the user device, including the private or default key and the transferred data, and then end. In this way, no data is exposed by the intermediate processing module.

One of ordinary skill in the art will recognize that process 900 may be performed in various appropriate ways without departing from the spirit of the invention. For instance, the process may not be performed as one continuous series of operations in some embodiments. In addition, the process may be implemented using several sub-processes, or as part of a larger macro-process. Furthermore, various processes may be performed concurrently, sequentially, or some combination of sequentially and concurrently. Moreover, the operations of the process may be performed in different orders.

Figure 10:
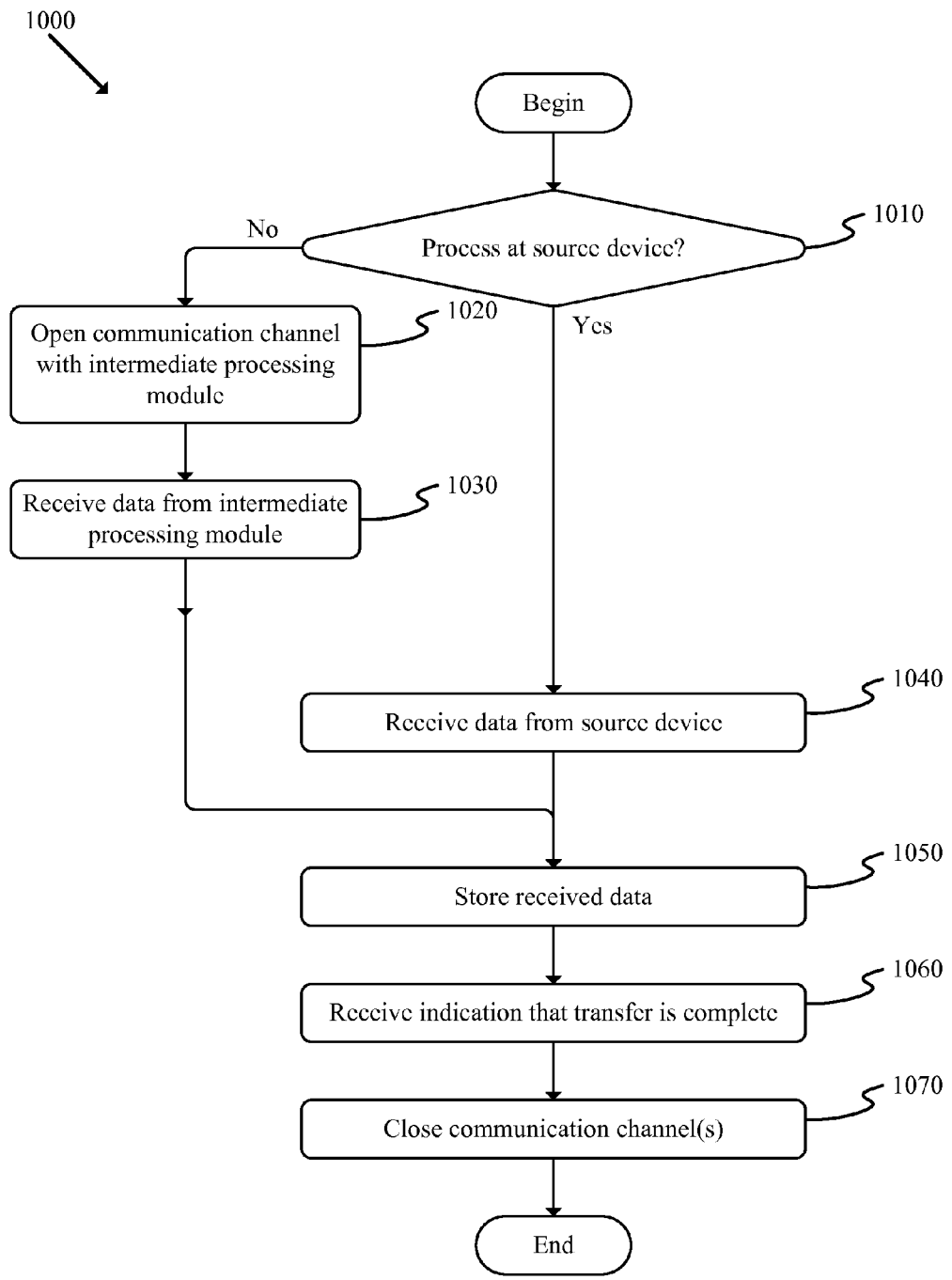

FIG. 10 illustrates a flow chart of a conceptual process 1000 used by some embodiments to download (or restore) data once a communication channel has been opened (e.g., operations 430-450 described above in reference to process 400). Specifically, the figure illustrates the server-side perspective when transferring data over an open communication channel. The process may be performed, for instance, by the server-side application 320 described above in reference to FIG. 3.

Process 1000 may begin, for instance, when a communication channel has been opened as described above in reference to FIGS. 5 and 6. Process 1000 may then determine (at 1010) whether the data will be processed at the source device. The determination may be made as described above in reference to FIG. 7. If process 1000 determines that the data will not be processed at the source device (i.e., when the data will be processed at the intermediate processing module), the process may open (at 1020) a communication channel with the intermediate processing module. Such a channel may be opened in a similar manner to that described above in reference to FIGS. 5 and 6. Next, the process may receive (at 1030) data from the intermediate processing module.

If process 1000 determines (at 1010) that data will be processed at the source device, the process may receive (at 1040) data from the source device. Such data may be received, for instance, over the previously-opened communication channel. Next, after receiving (at 1010 or 1040) the data, the process may store (at 1050) the received data. The data may be received and stored in a block-by-block fashion, as a complete file (or folder), and/or other appropriate ways. Storing the data may include writing the data to one or more storage devices (or storages), as appropriate.

The process may then receive (at 1060) an indication that the transfer of data is complete. The indication may be received from the source device and/or the intermediate processing module, as appropriate. Next, the process may close (at 1070) any open communication channels. Alternatively, the channel(s) may be left open to allow transfer of additional data (e.g., when transferring multiple files or folders at one time).

One of ordinary skill in the art will recognize that process 1000 may be performed in various appropriate ways without departing from the spirit of the invention. For instance, the process may not be performed as one continuous series of operations in some embodiments. In addition, the process may be implemented using several sub-processes, or as part of a larger macro-process. Furthermore, various processes may be performed concurrently, sequentially, or some combination of sequentially and concurrently. Moreover, the operations of the process may be performed in different orders.

IV. Data Restoration

Figure 11:
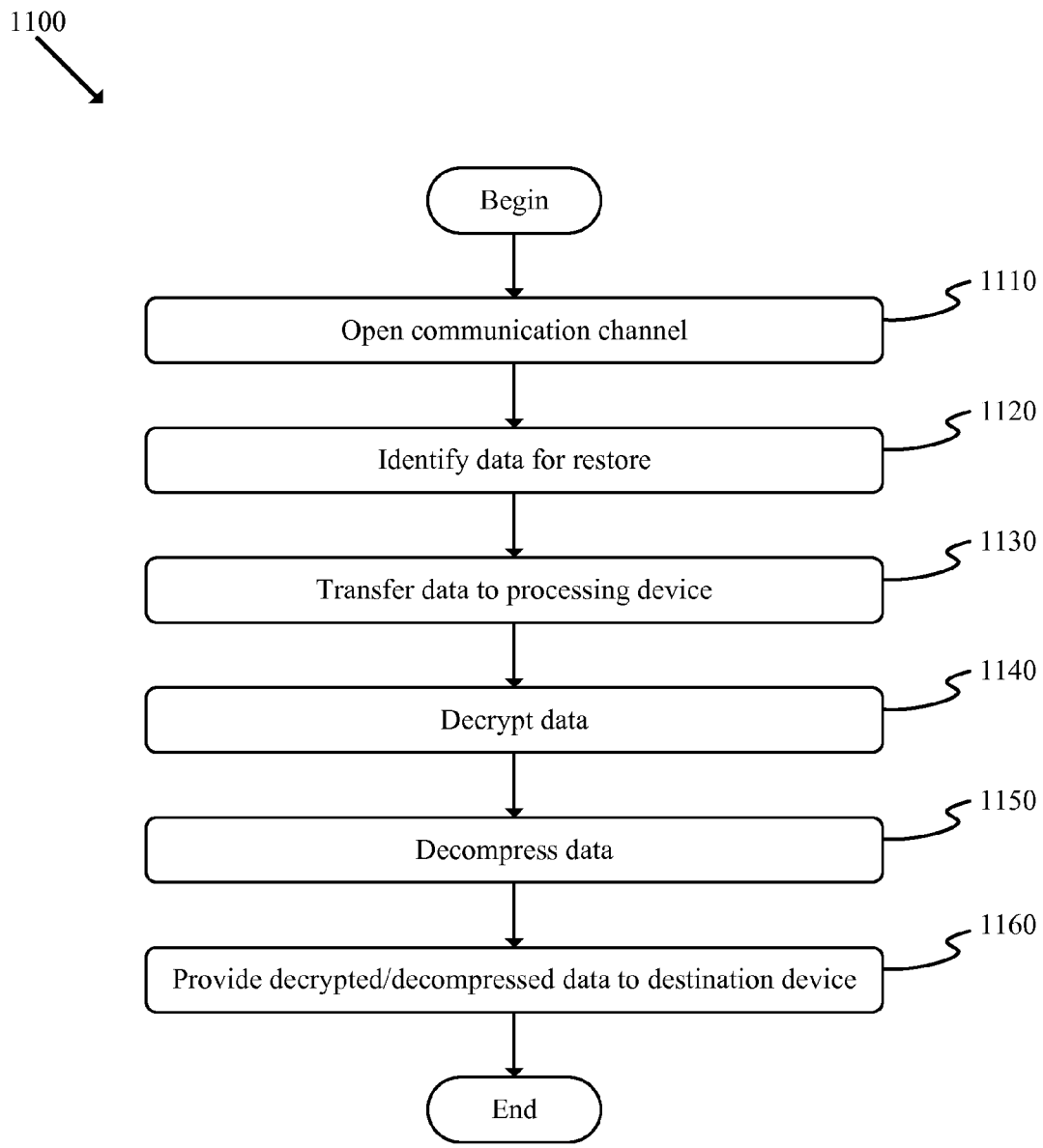
FIG. 11 illustrates a flow chart of a conceptual process used by some embodiments to download (or restore) data from a destination storage to a destination device.

FIG. 11 illustrates a flow chart of a conceptual process 1100 used by some embodiments to download (or restore) data from a destination storage to a destination device (e.g., a user device). In the discussion that follows, "restore" is intended to mean retrieving the data from the destination storage and making the data available to the destination device, however, the data may "restored" to a different destination device than originally produced the data (e.g., the data may be provided to the destination storage from a PC but restored to a Smartphone).

Process 1100 may begin, for example, when a user launches the client-side application of some embodiments, when the user selects data to be restored, at other appropriate times, and/or based on other events. For instance, in some cases data may be restored any time there is a change in associated data on the destination storage (e.g., a user device may be synced such that a folder on the user device is updated whenever there is change to the data stored at the destination storage). Next, the process may open (at 1110) a communication channel between the destination storage and the destination device. The communication channel may be opened in a similar manner to that described above in reference to processes 500 and 600.

Process 1100 may then identify (at 1120) data for restore. The data may be identified in various other appropriate ways. Such identification may occur when, for example, a user selects data using a client-side application running on a user device. The selected data may be remotely stored on an external device (e.g., destination storage 130 described above in reference to FIG. 1). Next, process 1100 may transfer (at 1130) the identified data to a processing device. The processing device may be the destination device or an intermediate processing module.

Process 1100 may then decrypt (at 1140) the identified data. Such decryption may use various appropriate tools and/or algorithms. The decryption may utilize the private or default key, as appropriate. Next, the process may decompress (at 1150) the decrypted data. The decryption 1140 and decompression 1150 operations may be performed using various appropriate resources, as described above in reference to process 700.

Next, process 1100 may provide (at 1160) the decompressed, decrypted data to the destination device and then end. If the decryption 1140 and decompression 1150 operations are performed at the destination device (e.g., a user device), the unlocked data may be moved to local storage, passed to a particular application running on the destination device, or otherwise made available to the destination device, as appropriate. If the decryption and decompression operations are performed at an intermediate processing module, the decompressed, decrypted data may be passed to the destination device from the intermediate processing module using channel encryption, or some other secure way.

One of ordinary skill in the art will recognize that process 1100 may be performed in various appropriate ways without departing from the spirit of the invention. For instance, the process may not be performed as one continuous series of operations in some embodiments. In addition, the process may be implemented using several sub-processes, or as part of a larger macro-process. Furthermore, various processes may be performed concurrently, sequentially, or some combination of sequentially and concurrently. Moreover, the operations of the process may be performed in different orders (e.g., data may be transferred to a destination device before being decrypted and decompressed).

Figure 12:
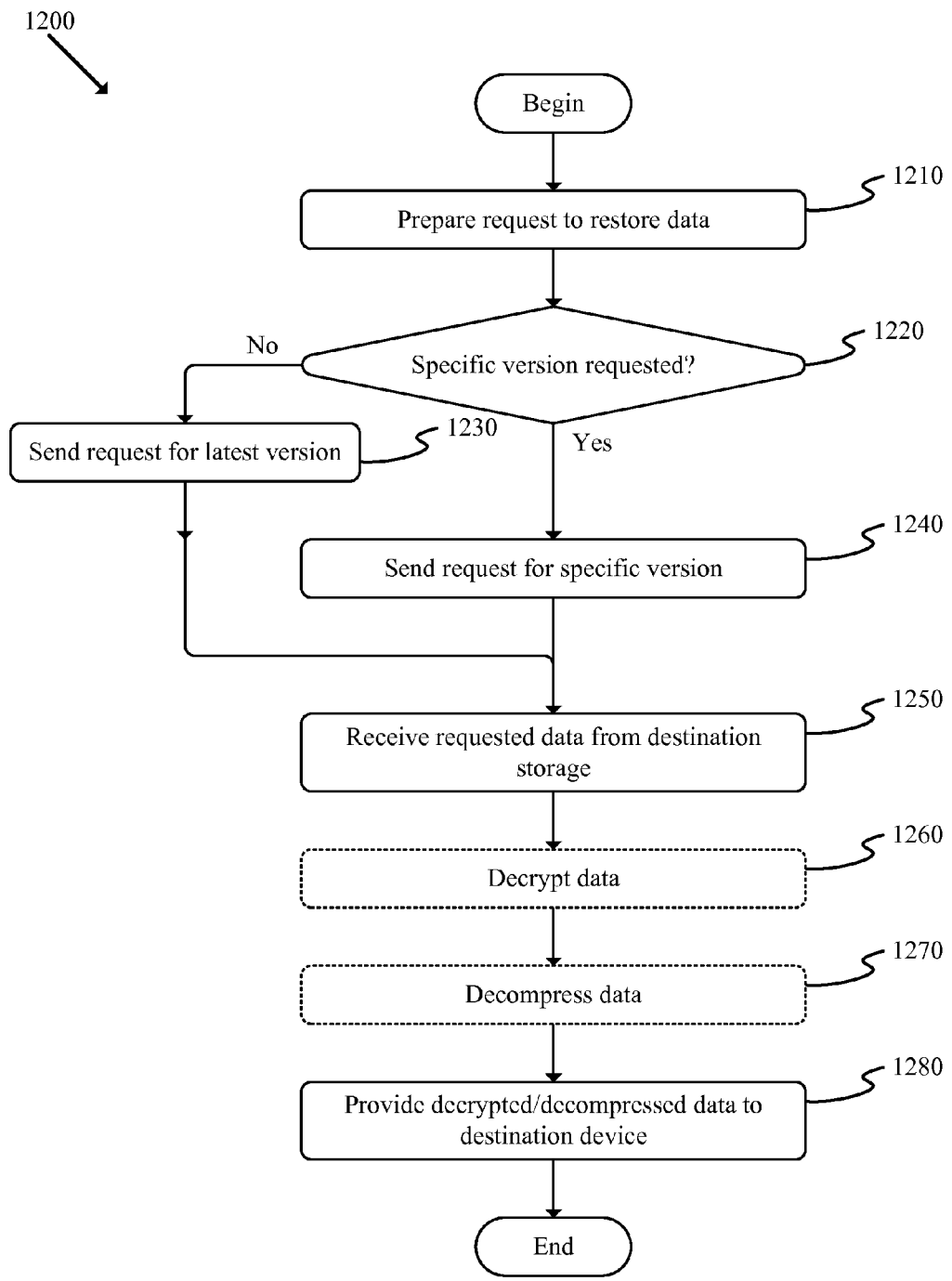
FIG. 12 illustrates a flow chart of a conceptual process used by some embodiments to seamlessly restore, from the client-side perspective, data to a destination device or other resource.

FIG. 12 illustrates a flow chart of a conceptual process 1200 used by some embodiments to download (or restore), from the client-side perspective, data to a destination device or other resource. The process may be performed, for instance, by the client-side application 310 described above in reference to FIG. 3. Process 1200 may begin, for instance, when a user launches the client-side application, when a user selects data for restore, at appropriate intervals, etc. In addition, a communication channel may be opened before beginning process 1200 in some embodiments.

Next, process 1200 may prepare (at 1210) a request to restore data. Such a request may be initiated by, for example, a user of the client-side application. Alternatively, the request may be generated automatically by an appropriate module. The process may then determine (at 1220) whether a specific version of the data has been requested. Such a determination may be at least partly based on data received from a user through an appropriate resource (e.g., the client-side application).

If no specific version of data is requested, the process may send (at 1230) a request to the server-side application for the latest version of the data (e.g., the most recently uploaded data). If a specific version of data is requested, the process may then send (at 1240) a request for the specific version to the destination storage. A request for a version may include any data blocks associated with the version.

The process may then receive (at 1250) the requested data from the destination storage. The requested data may be received at, for example, the intermediate processing module or a user device, as appropriate. Next, the process may decrypt (at 1260) the received data using appropriate tools and/or algorithms. The process may then decompress (at 1270) the decrypted data.

The decryption 1260 and decompression 1270 operations may be performed at the destination device if the device has sufficient capability. Alternatively, the decryption 1260 and decompression 1270 operations may be performed at the intermediate processing module. Finally, the decrypted and decompressed data may be provided (at 1280) to the destination device and process 1200 ends.

One of ordinary skill in the art will recognize that process 1200 may be performed in various appropriate ways without departing from the spirit of the invention. For instance, the process may not be performed as one continuous series of operations in some embodiments. In addition, the process may be implemented using several sub-processes, or as part of a larger macro-process. Furthermore, various processes may be performed concurrently, sequentially, or some combination of sequentially and concurrently. Moreover, the operations of the process may be performed in different orders (e.g., data may be provided to the destination device before being decrypted and decompressed).

Figure 13:
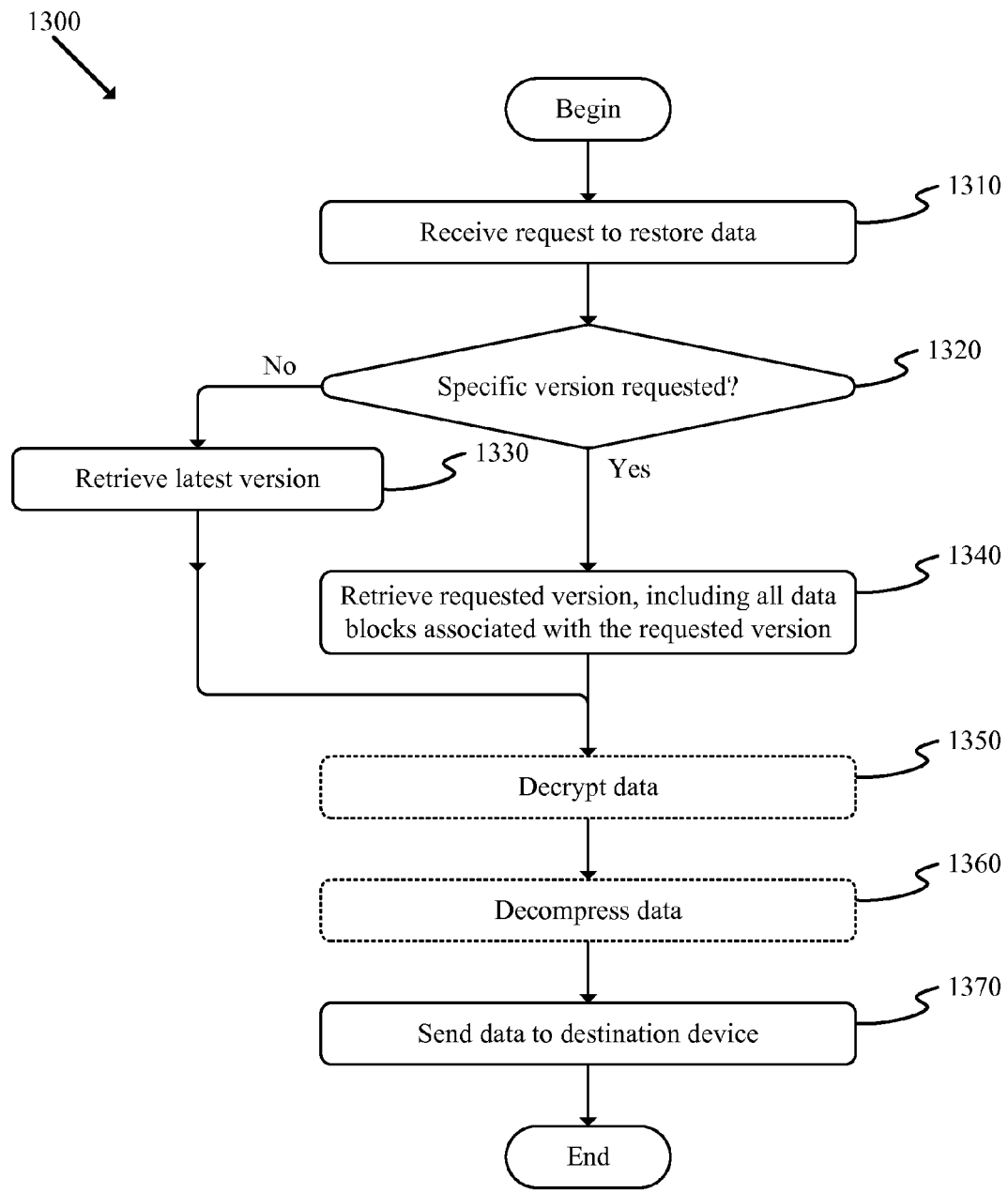
FIG. 13 illustrates a flow chart of a conceptual process used by some embodiments to restore, from the server-side perspective, data from a destination storage to a user device.

FIG. 13 illustrates a flow chart of a conceptual process 1300 used by some embodiments to download (or restore), from the server-side perspective, data from the destination storage to a destination device. The process may be performed, for instance, by the server-side application 320 described above in reference to FIG. 3. Process 1300 may begin, for instance, when a user launches the client-side application, when a user selects data for restore, at appropriate intervals, etc. In addition, a communication channel may be opened before beginning process 1300 in some embodiments.

Process 1300 may then receive (at 1310) a request to restore data. The request may include appropriate information (e.g., user data, user device data, version requested, etc.). The process then may determine (at 1320) whether a specific version of data has been requested. The determination may be at least partly based on an analysis of the request received at 1310.

If a specific version of requested data is not specified, the process may retrieve (at 1330) the latest version of the data. If a specific version of requested data is requested, the process may retrieve (at 1340) the specific version. The retrieved version may include all data blocks associated with the version.

Next, process 1300 may decrypt (at 1350) the retrieved data. The process may then decompress (at 1360) the decrypted data. Such decryption and/or decompression may be performed at the intermediate processing module or the destination device, as appropriate. The decryption and decompression may be performed using various appropriate tools and/or algorithms. The decryption may be performed using the private or default key, as appropriate. The process may then send (at 1370) the decrypted, decompressed data to the destination device and ends.

One of ordinary skill in the art will recognize that process 1300 may be performed in various appropriate ways without departing from the spirit of the invention. For instance, the process may not be performed as one continuous series of operations in some embodiments. In addition, the process may be implemented using several sub-processes, or as part of a larger macro-process. Furthermore, various processes may be performed concurrently, sequentially, or some combination of sequentially and concurrently. Moreover, the operations of the process may be performed in different orders (e.g., the data may be sent to the destination device before being decrypted and/or decompressed).

Figure 14:
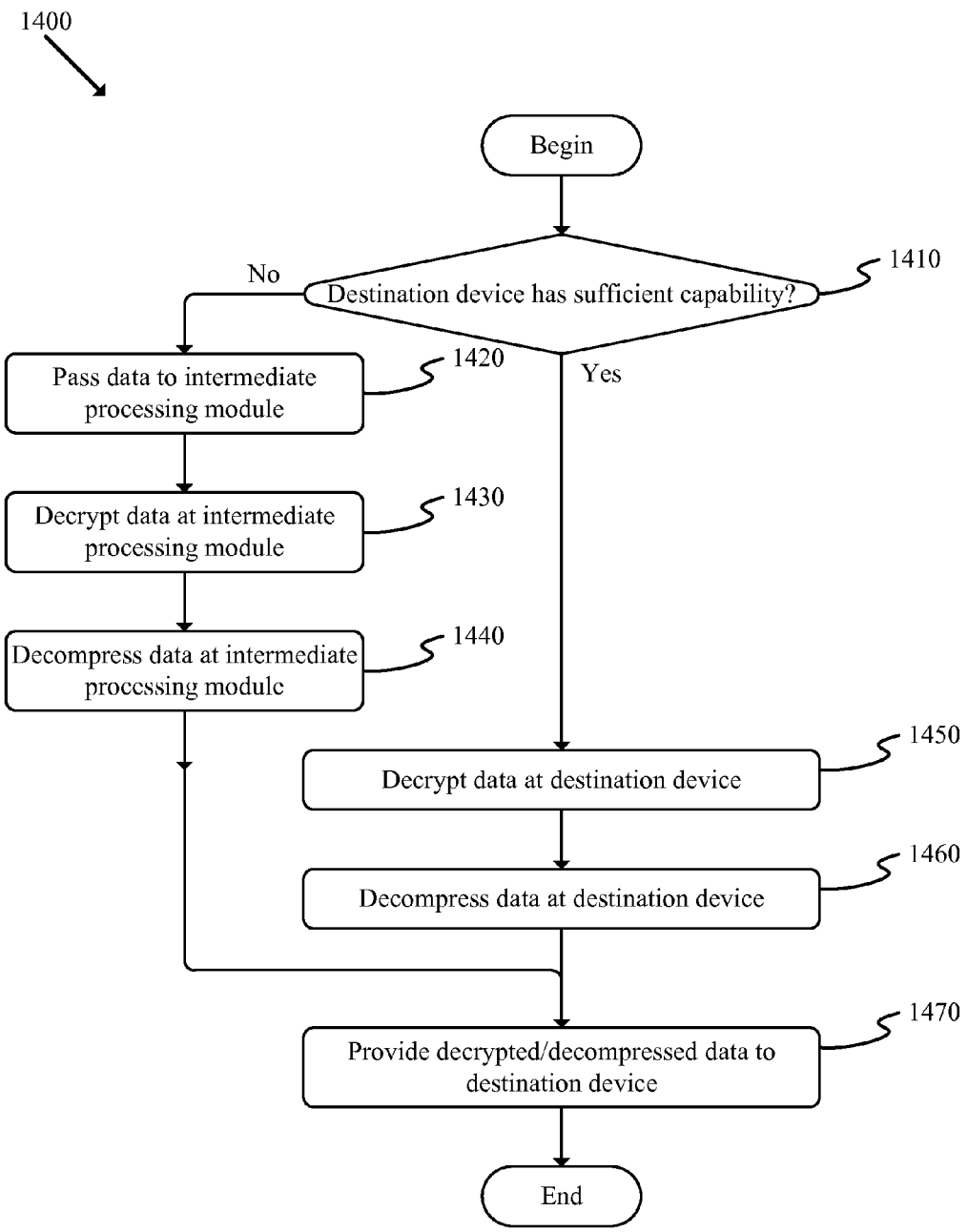
FIG. 14 illustrates a flow chart of a conceptual process used by some embodiments to decompress and decrypt data to be restored to a user device.

FIG. 14 illustrates a flow chart of a conceptual process 1400 used by some embodiments to decompress and decrypt data to be restored to a destination device (e.g., operations 1120-1130 described above in reference to process 1100). Specifically, the figure illustrates that decompression and decryption of data may occur at a destination device (e.g., the user device) or an intermediate processing module. Process 1400 may be performed by, for instance, the client-side application 310 or server-side application 320 described above in reference to FIG. 3, as appropriate.

Process 1400 may begin, for instance, after a communication channel has been opened between the client-side application and the server-side application. The process may then determine (at 1410) whether the destination device is capable of decompressing and/or decrypting data. Such a determination may be made by the client-side application in some embodiments. The determination may be based on various relevant factors such as, for instance, whether the destination device has sufficient computing power, processing power, storage, battery life, etc. In some cases, a particular destination device may be technically capable of compressing and/or encrypting data but may still pass the data to an intermediate processing module (e.g., to extend battery life of the source device, to allow the destination device to perform other tasks, to avoid affecting other operations of the destination device, etc.).

If the destination device does not have sufficient capability, the data may be passed (at 1420) to an intermediate processing module (e.g., module 130 described above in reference to FIG. 1). The data may be passed using channel encryption, with, for example, a secure socket layer (SSL) connection between the destination storage and the intermediate processing module.

The data may then be decrypted (at 1430) at the intermediate processing module. Decryption may utilize various appropriate algorithms and/or tools. In some embodiments, the data may be decrypted using the private or default key described above in reference to processes 500 and 600, as appropriate. The data may then be decompressed (at 1440) at the intermediate processing module. Such decompression may utilize various appropriate tools and/or algorithms to restore the data to its original format.

If process 1400 determines (at 1410) that the destination device has sufficient processing capability, the data may be decrypted (at 1450) at the destination device. The decompressed data may then be decompressed (at 1460) at the destination device. As above, the decryption and decompression may be performed using various appropriate algorithms and/or tools. The decryption may be performed block-by-block, or a whole file (or folder) may be decrypted. In addition, the decryption may be accomplished using the private or default key.

Process 1400 then provides (at 1470) the decrypted and decompressed data to the destination device. After providing the data, the process ends. If the decryption 1450 and decompression 1460 operations are performed at the destination device (e.g., a user device), the unlocked data may be moved to local storage, passed to a particular application running on the destination device, or otherwise made available to the destination device, as appropriate. If the decryption and decompression operations are performed at the intermediate processing module, the decompressed, decrypted data may be passed to the destination device from the intermediate processing module using channel encryption, or some other secure way.

One of ordinary skill in the art will recognize that process 1400 may be performed in various appropriate ways without departing from the spirit of the invention. For instance, the process may not be performed as one continuous series of operations in some embodiments. In addition, the process may be implemented using several sub-processes, or as part of a larger macro-process. Furthermore, various processes may be performed concurrently, sequentially, or some combination of sequentially and concurrently. Moreover, the operations of the process may be performed in different orders.

Figure 15:
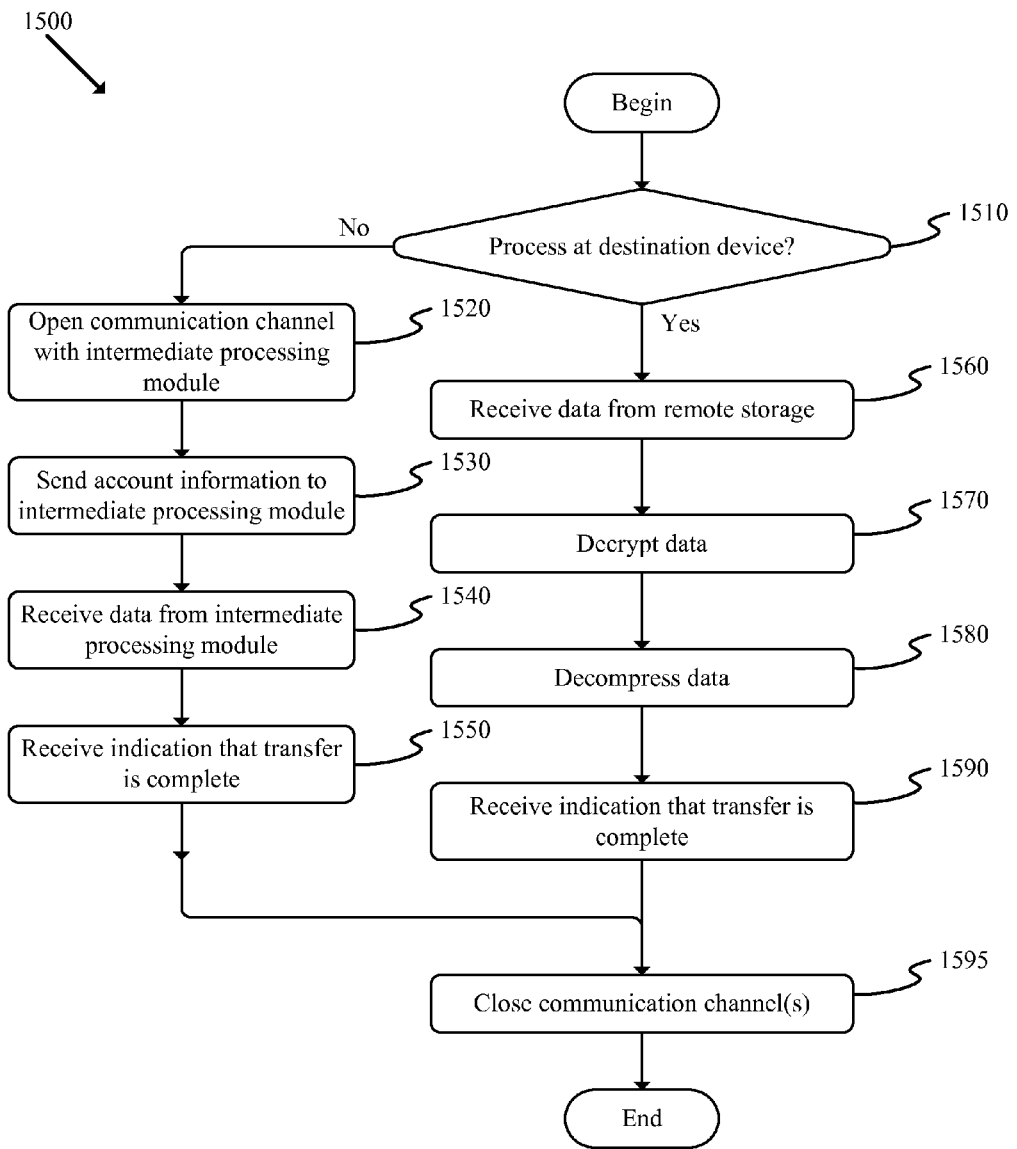
FIGS. 15-17 illustrate flow charts of conceptual processes used by some embodiments to download (or restore) data once a communication channel has been opened.

FIG. 15 illustrates a flow chart of a conceptual process 1500 used by some embodiments to transfer (restore) data once a communication channel has been opened (e.g., operations 1130-1150 described above in reference to process 1100). Specifically, the figure illustrates the client-side perspective when restoring data over an open communication channel. The process may be performed, for instance, by the client-side application 310 described above in reference to FIG. 3.

Process 1500 may begin, for instance, when a communication channel has been opened as described above in reference to FIGS. 5 and 6. Process 1500 may then determine (at 1510) whether the data will be processed at the destination device. The determination may be made as described above in reference to FIG. 7. If process 1500 determines that the data will not be processed at the destination device (i.e., when the data will be processed at the intermediate processing module), the process may open (at 1520) a communication channel with the intermediate processing module. Such a channel may be opened in a similar manner to that described above in reference to FIGS. 5 and 6. Next, the process may send (at 1530) account information to the intermediate processing module. The account information may include the private or default key, user data (e.g., user name and password), and/or other data (e.g., various flags, information regarding the user device, etc.).

The process may then receive (at 1540) data from the intermediate processing module. Such data may be received block-by-block, as a complete file (or folder), etc. Next, the process may receive (at 1550) an indication that the transfer of data is complete.

If process 1500 determines (at 1510) that the data will be processed at the destination device, the process may receive (at 1560) the data from the destination storage. The data may be received block-by-block, as a complete file (or folder), etc. Such data may be received, for instance, over the previously-opened communication channel. Next, the process may decrypt (at 1570) the data. The process may then decompress (at 1580) the data. The process may then receive (at 1590) an indication that the transfer is complete.

Finally, after receiving (at 1550 or 1590) an indication that the transfer is complete, the process may close (at 1595) any open communication channel(s). Alternatively, the channel(s) may be left open to allow transfer of additional data (e.g., when transferring multiple files or folders at one time). The transferred data may be used in various different ways by the user device (e.g., placed in storage, provided to an application, etc.).

One of ordinary skill in the art will recognize that process 1500 may be performed in various appropriate ways without departing from the spirit of the invention. For instance, the process may not be performed as one continuous series of operations in some embodiments. In addition, the process may be implemented using several sub-processes, or as part of a larger macro-process. Furthermore, various processes may be performed concurrently, sequentially, or some combination of sequentially and concurrently. Moreover, the operations of the process may be performed in different orders.

Figure 16:
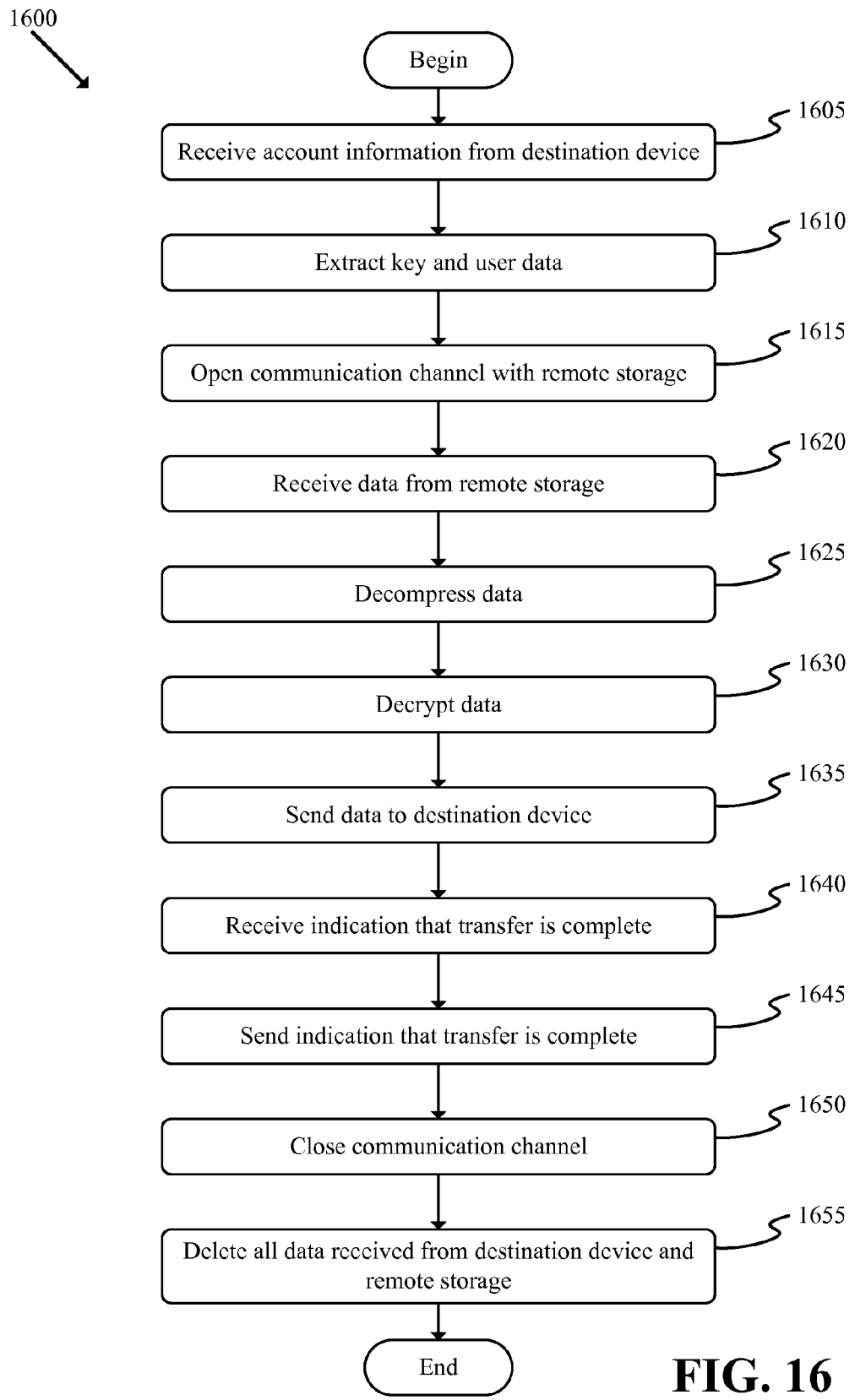

FIG. 16 illustrates a flow chart of a conceptual process 1600 used by some embodiments to transfer data once a communication channel has been opened (e.g., operations 1130-1150 described above in reference to process 1100).

Specifically, the figure illustrates the intermediate processing module perspective when transferring data over an open communication channel. The process may be performed, for instance, by the server-side application 320 described above in reference to FIG. 3.

Process 1600 may begin, for instance, when a communication channel has been opened as described above in reference to operation 1520 of process 1500. Process 1600 may then receive (at 1605) account information from the destination device. The account information may include the private or default key, user data (e.g., user name and password), and/or other data (e.g., various flags, information regarding the user device, etc.). The process may then extract (at 1610) the key, user data, and/or other data, as appropriate, from the concatenated string. Next, the process may open (at 1615) a communication channel with the destination storage. Such a channel may be opened in a similar manner to that described above in reference to FIGS. 5 and 6.

The process may then receive (at 1620) data from the destination storage. Such data may be received block-by-block, as a complete file (or folder), etc. Next, the process may decrypt (at 1625) and decompress (at 1630) the data. The process may then send (at 1635) the decompressed, decrypted data to the user device. Next, the process may receive (at 1640), from the destination storage, an indication that the transfer is complete. Process 1600 may, in turn, send (at 1645), to the destination device, an indication that the transfer is complete. Next, the process may close (at 1650) any open communication channels. As above, the channel(s) may alternatively be left open to allow transfer of additional data (e.g., when transferring multiple files or folders at one time).

The process may then delete (at 1655) all data received from the destination device, including the private or default key and the transferred data, and end. In this way, no data is exposed by the intermediate processing module.

One of ordinary skill in the art will recognize that process 1600 may be performed in various appropriate ways without departing from the spirit of the invention. For instance, the process may not be performed as one continuous series of operations in some embodiments. In addition, the process may be implemented using several sub-processes, or as part of a larger macro-process. Furthermore, various processes may be performed concurrently, sequentially, or some combination of sequentially and concurrently. Moreover, the operations of the process may be performed in different orders.

Figure 17:
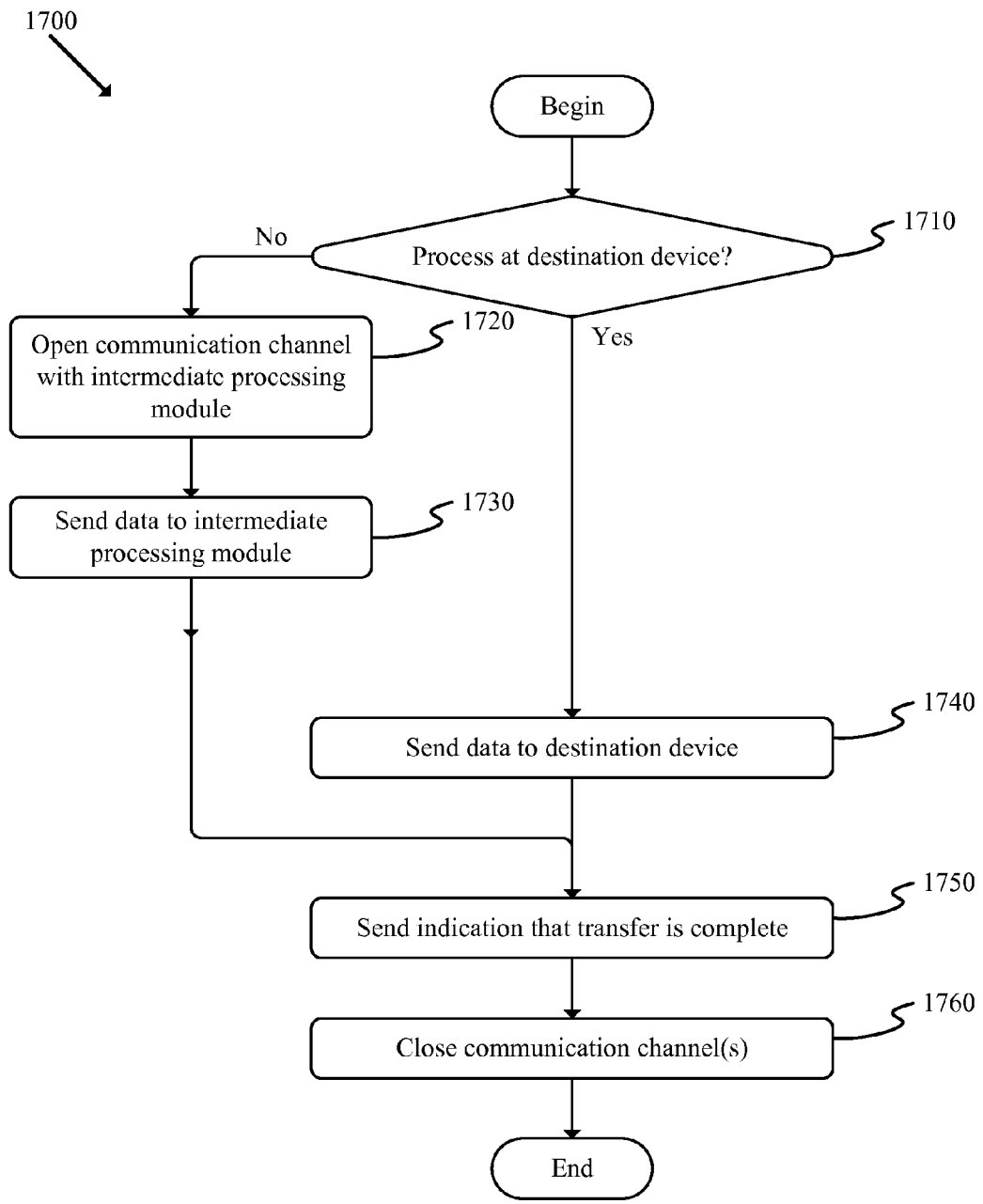

FIG. 17 illustrates a flow chart of a conceptual process 1700 used by some embodiments to transfer data after a communication channel has been opened (e.g., operations 1130-1150 described above in reference to process 400). Specifically, the figure illustrates the server-side perspective when transferring data over an open communication channel. The process may be performed, for instance, by the server-side application 320 described above in reference to FIG. 3.

Process 1700 may begin, for instance, when a communication channel has been opened as described above in reference to FIGS. 5 and 6. Process 1700 may then determine (at 1710) whether the data will be processed at the destination device. The determination may be made as described above in reference to FIG. 14. If process 1700 determines that the data will not be processed at the destination device (i.e., when the data will be processed at the intermediate processing module), the process may open (at 1720) a communication channel with the intermediate processing module. Such a channel may be opened in a similar manner to that described above in reference to FIGS. 5 and 6. Next, the process may send (at 1730) data to the intermediate processing module.

If process 1700 determines (at 1710) that data will be processed at the destination device, the process may send (at 1740) data to the destination device. Such data may be sent, for instance, over the previously-opened communication channel. The data may be sent in a block-by-block fashion, as a complete file (or folder), etc. Next, after sending (at 1710 or 1740) the data, the process may send (at 1750) an indication, to the destination device and/or intermediate processing module, as appropriate, that the transfer is complete.

The process may then close (at 1760) any open communication channels. Alternatively, the channel(s) may be left open to allow transfer of additional data (e.g., when transferring multiple files or folders at one time).

One of ordinary skill in the art will recognize that process 1700 may be performed in various appropriate ways without departing from the spirit of the invention. For instance, the process may not be performed as one continuous series of operations in some embodiments. In addition, the process may be implemented using several sub-processes, or as part of a larger macro-process. Furthermore, various processes may be performed concurrently, sequentially, or some combination of sequentially and concurrently. Moreover, the operations of the process may be performed in different orders.

Figure 18:
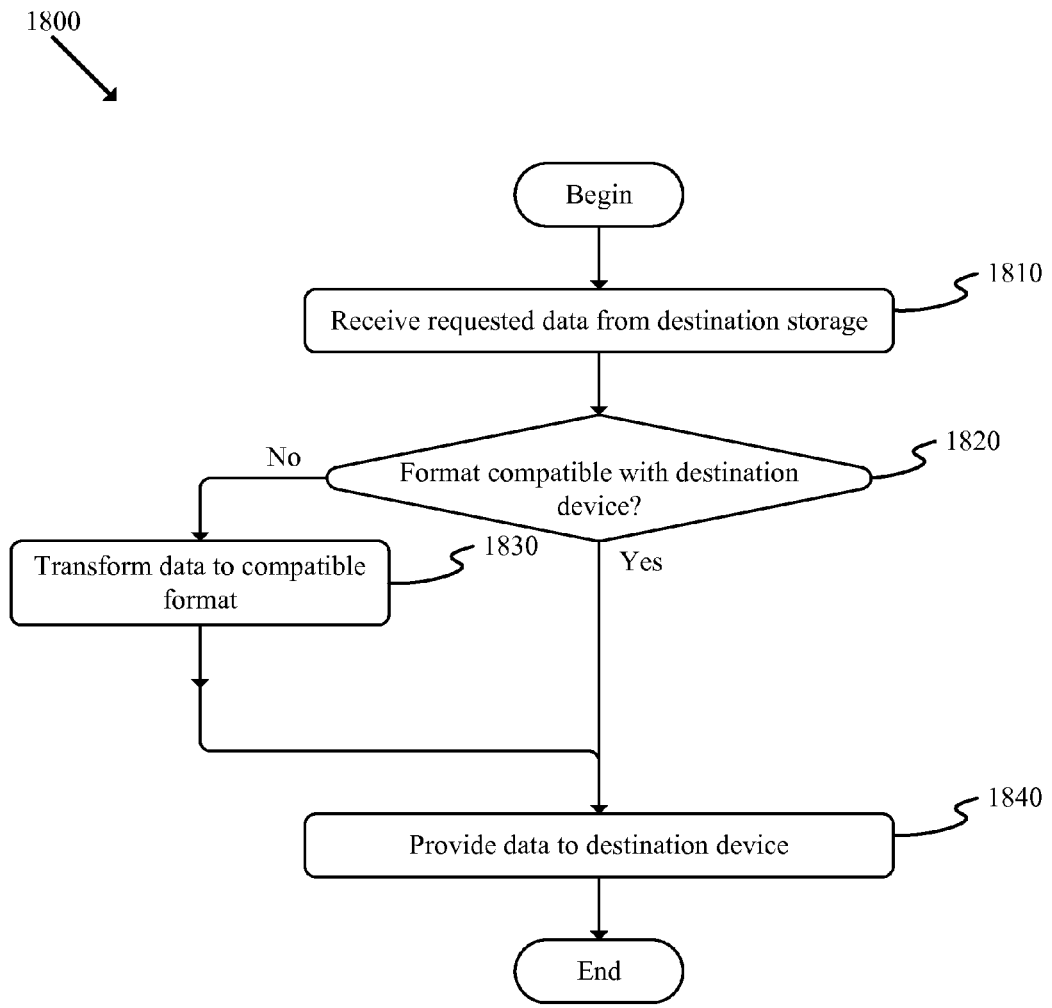
FIG. 18 illustrates a flow chart of a conceptual process used by some embodiments for device-specific restoration of data.

FIG. 18 illustrates a flow chart of a conceptual process 1800 used by some embodiments for device-specific restoration of data (e.g. contacts backed up from a first mobile device may be restored to a second mobile device in an appropriate format for the second mobile device). Process 1800 may begin after any requested data has been decompressed and/or decrypted. Process 1800 may be performed by a user device.

Next, the process may receive (at 1810) requested data from the destination storage (or intermediate processing module). In some embodiments, data may be stored to the destination storage using an intermediate format that allows the data to be transformed as appropriate to be accessible to a particular destination device. The process may then determine (at 1820) whether the requested data is in a format compatible with the destination device. Such a determination may be based on various appropriate factors (e.g., the type of data, the type of destination device, the type of device used to generate the data, etc.).

If data received from the server is not in a format matching the destination device, the process may transform (at 1830) the data into a proper format compatible with the destination device. The transformation may involve various appropriate operations (e.g., the data may be reorganized, reformatted, etc.). The transformation may be performed by, for example, a client-side application (e.g., application 310 described above in reference to FIG. 3) running on a user device (e.g., user device 110 described above in reference to FIG. 1).

After transforming (at 1830) the data, or determining (at 1820) that the data is in a format compatible with the destination device, process 1800 may provide (at 1840) the data to the destination device.

The ability to restore data in different formats is beneficial as it allows information to be easily accessible from numerous types of devices (e.g., contacts from a first type of Smartphone may be restored to a second type of Smartphone).

One of ordinary skill in the art will recognize that process 1800 may be performed in various appropriate ways without departing from the spirit of the invention. For instance, the process may not be performed as one continuous series of operations in some embodiments. In addition, the process may be implemented using several sub-processes, or as part of a larger macro-process. Furthermore, various processes may be performed concurrently, sequentially, or some combination of sequentially and concurrently. Moreover, the operations of the process may be performed in different orders.

V. Account Creation

Figure 19:
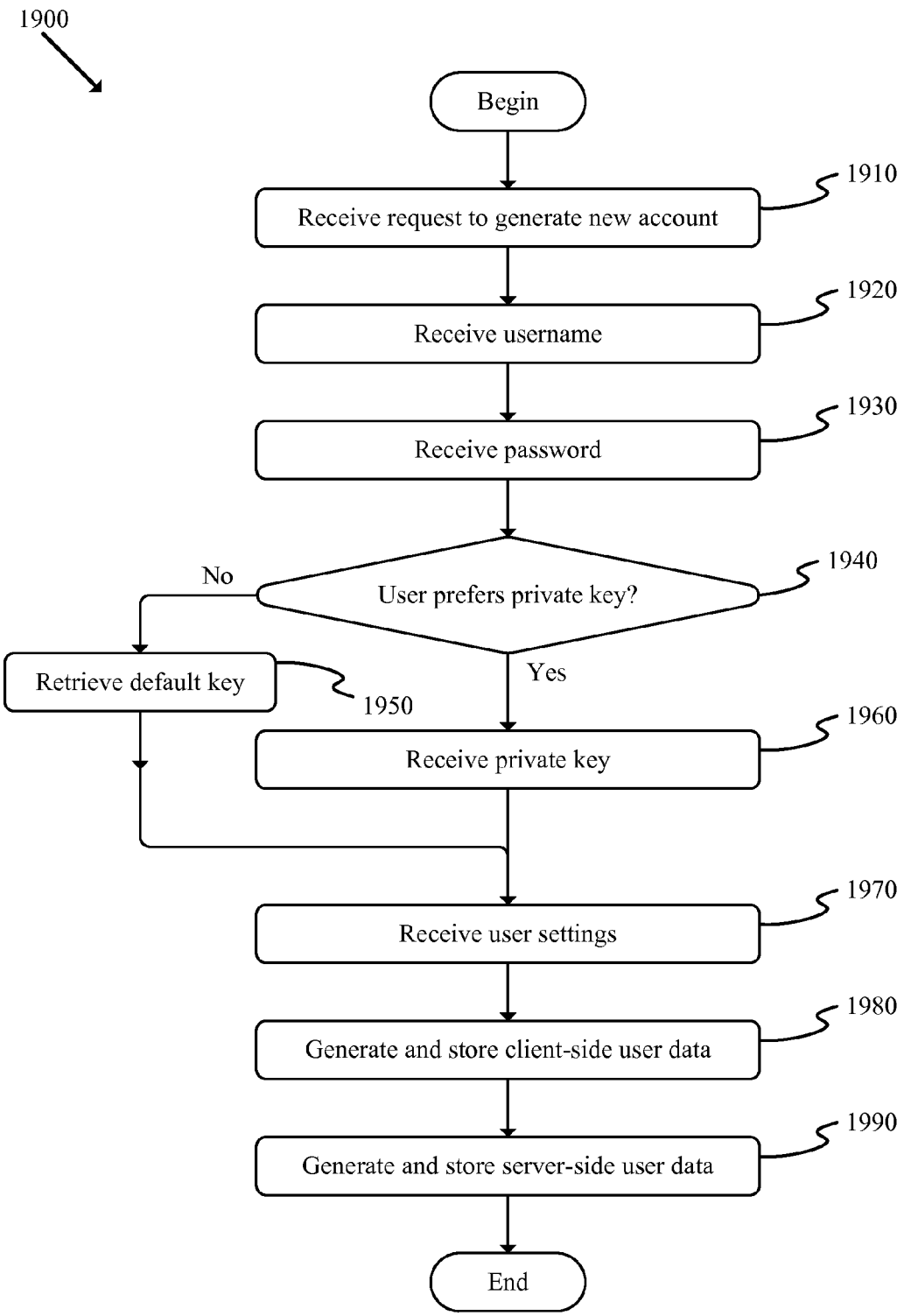
FIG. 19 illustrates a flow chart of a conceptual process used by some embodiments to create a new user account.

FIG. 19 illustrates a flow chart of a conceptual process 1900 used by some embodiments to create a new user account. Process 1900 may be implemented using a client-side application (e.g., client-side application 310 described above in reference to FIG. 3) and/or a server-side application (e.g., server-side application 320 described above in reference to FIG. 3). The process may begin, for instance, when a new user creates an account (e.g., when the user first launches a client-side application of some embodiments).

Next, the process may receive (at 1910) a request to generate a new account. The process then may receive (at 1920) a username. The process then may receive (at 1930) a password for the user. Such a username and password may be supplied by the user and entered in any appropriate way (e.g., using a keyboard, touchscreen, etc.).

The process may then determine (at 1940) whether the user prefers to use a private key. Such a determination may be at least partly based on data entered by the user (e.g., a selection of a private key option instead of a default key option). If the process determines that the user does not desire to use a private key, the process may retrieve (at 1950) a default key, otherwise, the process may receive (at 1960) the private key from the user. In either case, the process then may receive (at 1970) various user settings. Such settings may include user preferences (e.g., automatic backup frequency) and/or other appropriate information. Next, the process may generate and store (at 1980) client-side user data. Finally, the process may generate and store (at 1990) server-side user data. Such client-side and/or server-side data may include information such as the username, password, private key, biographical information (name, address, etc.), and/or other appropriate information.

One of ordinary skill in the art will recognize that process 1900 may be performed in various appropriate ways without departing from the spirit of the invention. For instance, the process may not be performed as one continuous series of operations in some embodiments. In addition, the process may be implemented using several sub-processes, or as part of a larger macro-process. Furthermore, various processes may be performed concurrently, sequentially, or some combination of sequentially and concurrently. Moreover, the operations of the process may be performed in different orders.

VI. Process for Defining a Destination Storage Application

Figure 20:
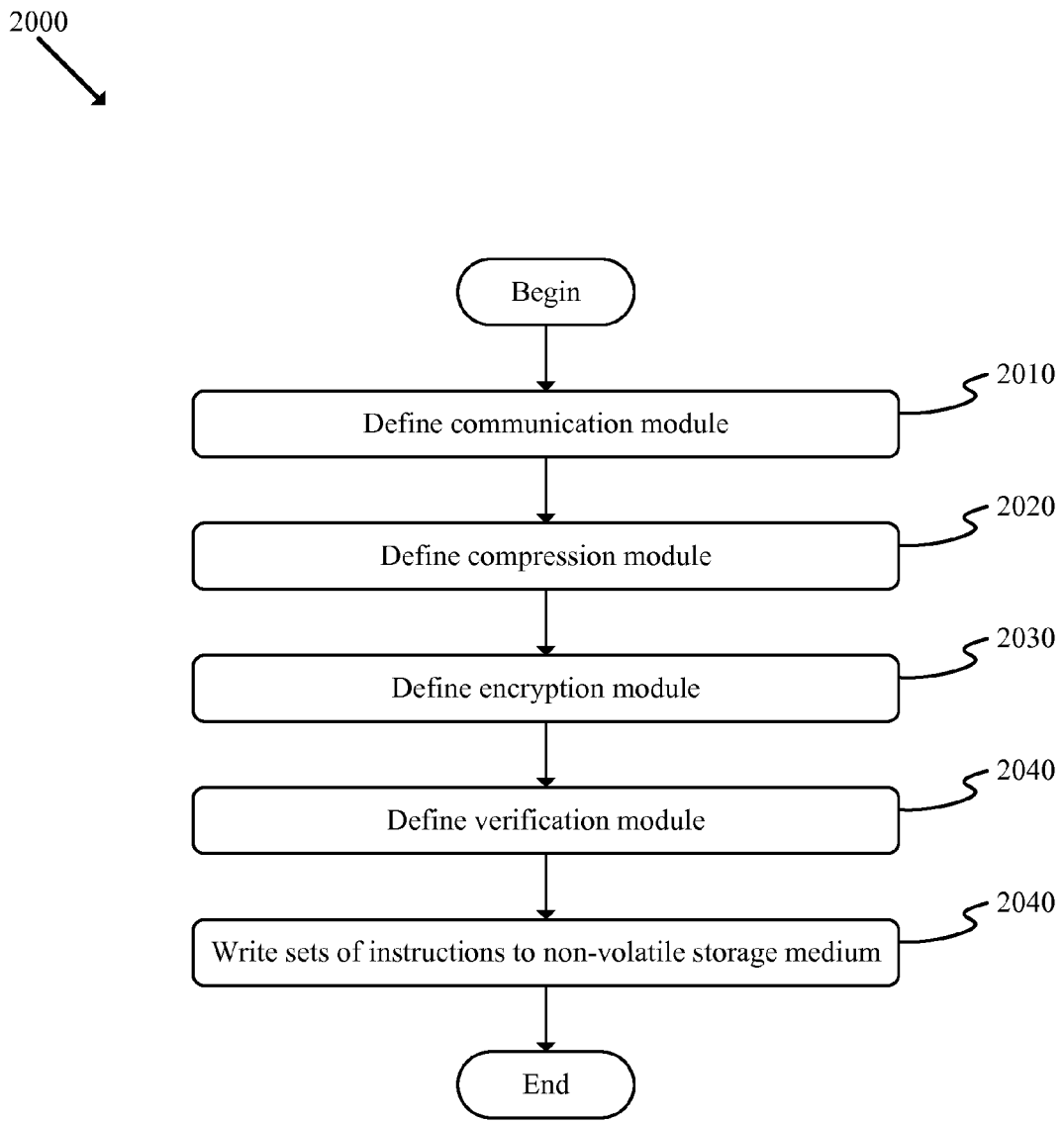
FIG. 20 illustrates a flow chart of a conceptual process used by some embodiments to define and store a destination storage application of some embodiments.

FIG. 20 illustrates a flow chart of a conceptual process 2000 used by some embodiments to define and store a destination storage application of some embodiments. Specifically, process 2000 illustrates the operations used to define sets of instructions for providing several of the elements shown in FIG. 3 and for performing various backup, restore, encryption/decryption, compression/decompression, data transformation, and user account creation operations described above. The process 2000 may be used to generate a client-side application of some embodiments (e.g., client-side application 310 described above in reference to FIG. 3).

Process 2000 may begin when a manufacturing facility generates a computer program product for use by consumers. As shown, the process may define (at 2010) sets of instructions for implementing a communication module (e.g., communication module 330 described above in reference to FIG. 3). In some cases such sets of instructions are defined in terms of object-oriented programming code. For example, some embodiments may include sets of instructions for defining classes and instantiating various objects at runtime based on the defined classes. The process may then define (at 2020) sets of instructions for implementing a compression module (e.g., compression module 335 described above in reference to FIG. 3).

Next, process 2000 may define (at 2030) sets of instructions for implementing an encryption module (e.g., encryption module 340 described above in reference to FIG. 3). Process 2000 then may define (at 2040) sets of instructions for implementing a verification module (e.g., verification module 345 described above in reference to FIG. 3). Finally, the process may write (at 2050) the sets of instructions to a non-volatile storage medium.

One of ordinary skill in the art will recognize that the various sets of instructions defined by process 2000 are not exhaustive of the sets of instructions that could be defined and stored on a computer readable storage medium for a destination storage application incorporating some embodiments of the invention. In addition, the process 2000 is a conceptual process, and the actual implementations may vary. For example, different embodiments may define the various sets of instructions in a different order, may define several sets of instructions in one operation, may decompose the definition of a single set of instructions into multiple operations, etc. In addition, the process 2000 may be implemented as several sub-processes or combined with other operations within a macro-process.

VII. Computer System

Many of the processes and modules described above may be implemented as software processes that are specified as at least one set of instructions recorded on a non-transitory storage medium. When these instructions are executed by one or more computational elements (e.g., microprocessors, microcontrollers, Digital Signal Processors ("DSPs"), Application-Specific ICs ("ASICs"), Field Programmable Gate Arrays ("FPGAs"), etc.) the instructions cause the computational element(s) to perform actions specified in the instructions.

Figure 21:
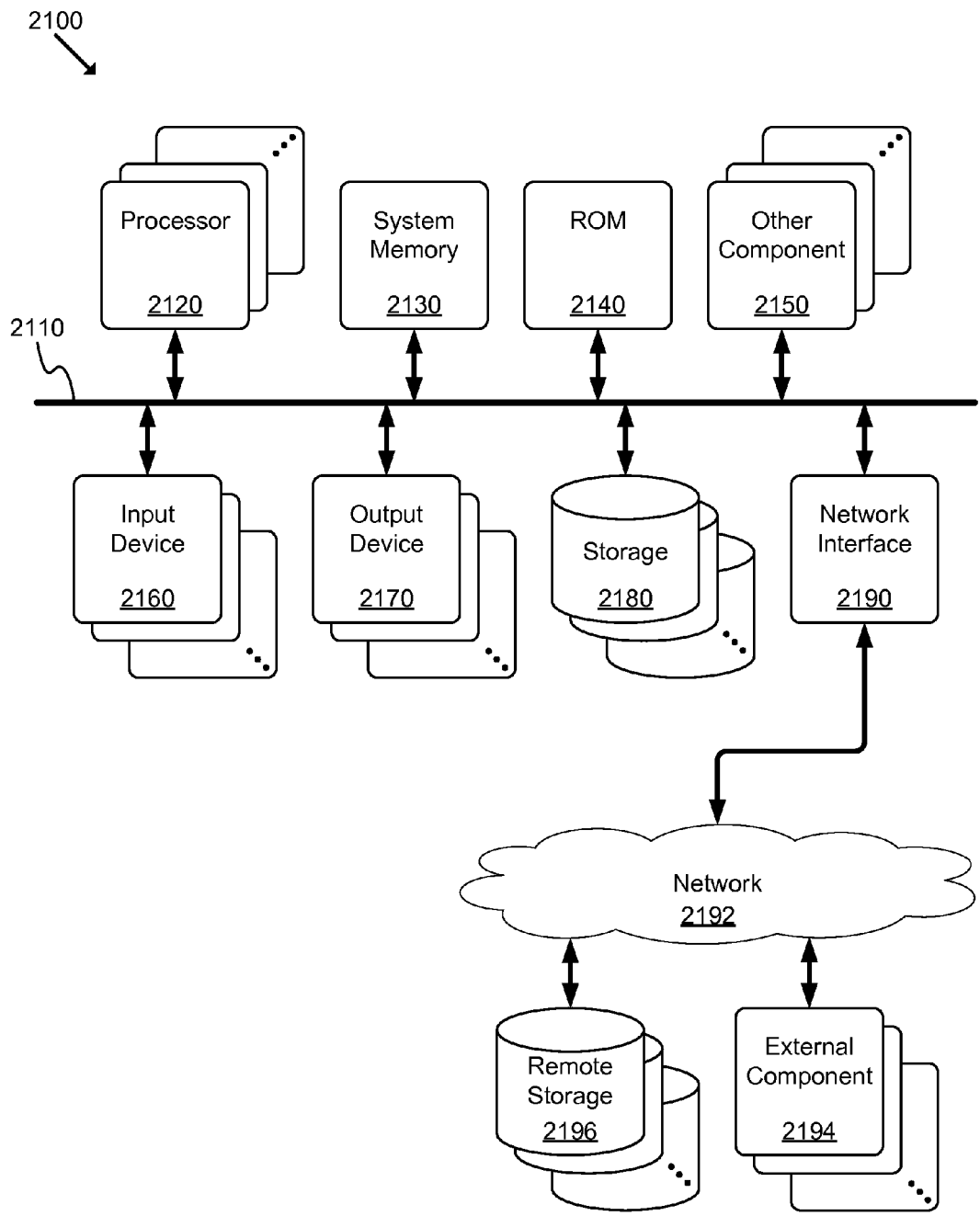
FIG. 21 illustrates a schematic block diagram of a conceptual computer system with which some embodiments of the invention may be implemented.

FIG. 21 illustrates a schematic block diagram of a conceptual computer system 2100 with which some embodiments of the invention may be implemented. For example, the system described above in reference to FIG. 1 may be at least partially implemented using computer system 2100. As another example, the processes described in reference to FIGS. 4-19 may be at least partially implemented using sets of instructions that are executed using computer system 2100.

Computer system 2100 may be implemented using various appropriate devices. For instance, the computer system may be implemented using one or more personal computers ("PC"), servers, mobile devices (e.g., a Smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

Computer system 2100 may include a bus 2110, at least one processing element 2120, a system memory 2130, a read-only memory ("ROM") 2140, other components (e.g., a graphics processing unit) 2150, input devices 2160, output devices 2170, permanent storage devices 2180, and/or a network connection 2190. The components of computer system 2100 may be electronic devices that automatically perform operations based on digital and/or analog input signals. For instance, the various example software modules described above in reference to FIG. 3 may be at least partially implemented using sets of instructions that are run on computer system 2100.

Bus 2110 represents all communication pathways among the elements of computer system 2100. Such pathways may include wired, wireless, optical, and/or other appropriate communication pathways. For example, input devices 2160 and/or output devices 2170 may be coupled to the system 2100 using a wireless connection protocol or system. The processor 2120 may, in order to execute the processes of some embodiments, retrieve instructions to execute and data to process from components such as system memory 2130, ROM 2140, and permanent storage device 2180. Such instructions and data may be passed over bus 2110.

ROM 2140 may store static data and instructions that may be used by processor 2120 and/or other elements of the computer system. Permanent storage device 2180 may be a read-and-write memory device. This device may be a non-volatile memory unit that stores instructions and data even when computer system 2100 is off or unpowered. Permanent storage device 200 may include a mass-storage device (such as a magnetic or optical disk and its corresponding disk drive).

Computer system 2100 may use a removable storage device and/or a destination storage device as the permanent storage device. System memory 2130 may be a volatile read-and-write memory, such as a random access memory ("RAM"). The system memory may store some of the instructions and data that the processor uses at runtime. The sets of instructions and/or data used to implement some embodiments may be stored in the system memory 2130, the permanent storage device 2180, and/or the read-only memory 2140. For example, the various memory units may include instructions for authenticating a client-side application at the server-side application in accordance with some embodiments. Other components 2150 may perform various other functions. These functions may include interfacing with various communication devices, systems, and/or protocols.

Input devices 2170 may enable a user to communicate information to the computer system and/or manipulate various operations of the system. The input devices may include keyboards, cursor control devices, audio input devices and/or video input devices. Output devices 2180 may include printers, displays, and/or audio devices. Some or all of the input and/or output devices may be wirelessly or optically connected to the computer system.

Finally, as shown in FIG. 21, computer system 2100 may be coupled to a network 2192 through a network adapter 2190. For example, computer system 2100 may be coupled to a web server on the Internet such that a web browser executing on computer system 2100 may interact with the web server as a user interacts with an interface that operates in the web browser.

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 2100 may be used in conjunction with the invention. Moreover, one of ordinary skill in the art will appreciate that many other system configurations may also be used in conjunction with the invention or components of the invention.

Moreover, while the examples shown may illustrate many individual modules as separate elements, one of ordinary skill in the art would recognize that these modules may be combined into a single functional block or element. One of ordinary skill in the art would also recognize that a single module may be divided into multiple modules.

While the invention has been described with reference to numerous specific details, one of ordinary skill in the art will recognize that the invention can be embodied in other specific forms without departing from the spirit of the invention. For example, several embodiments were described above by reference to particular features and/or components. However, one of ordinary skill in the art will realize that other embodiments might be implemented with other types of features and components. One of ordinary skill in the art would understand that the invention is not to be limited by the foregoing illustrative details, but rather is to be defined by the appended claims.

We claim:

1. A method for remotely storing user data having uniform encryption among a plurality of devices, the method comprising:
   opening a first communication channel between a user device and an intermediate processing module;
   receiving, performed by a processor, user account information from the user device over the first communication channel for temporary use at the intermediate processing module, wherein the user account information includes at least a user account encryption key;
   receiving user data for remote storage from the user device at the intermediate processing module;
   encrypting the user data at the intermediate processing module using the received user account encryption key;
   opening a second communication channel between the intermediate processing module and a destination storage, wherein the second communication channel is opened after authentication of a user account using the received user account information;
   transferring the encrypted user data from the intermediate processing module to the destination storage;
   removing the user account information from the intermediate processing module;
   receiving a dynamic string; and
   generating a shared encryption key using an automated algorithm, wherein the shared encryption key is based at least partly on the dynamic string; and
   authenticating user access to the intermediate processing module, wherein authenticating user access comprises:
      receiving encrypted authentication data from the user device;
      decrypting the authentication data using the shared encryption key; and
      extracting the user account information from the decrypted authentication data for comparison with previously stored user account information.

2. The method of claim 1, wherein authentication of the user account using the received user account information comprises comparing the received user account information with previously stored user account information.

3. The method of claim 1 further comprising compressing the user data at the intermediate processing module.

4. The method of claim 1, wherein opening the second communication channel comprises:
   sending the received account information to a remote authentication server; and receiving an indication of authentication from the remote authentication server when the received user account information matches previously stored user account information.

5. The method of claim 1, wherein the first communication channel is an encrypted communication channel.

6. An apparatus for remotely storing user data with uniform encryption among a plurality of devices, the apparatus comprising:
a storage that receives and transmits user data;
a memory that stores at least one set of instructions for encrypting user data; and
a processor that executes the at least one set of instructions, where in the at least one set of instructions are for:
opening a first communication channel between a user device and an intermediate processing module;
receiving user account information from the user device over the first communication channel for temporary use at the intermediate processing module, wherein the user account information includes at least a user account encryption key;
receiving user data for remote storage from the user device at the intermediate processing module;
encrypting the user data at the intermediate processing module using the received user account encryption key;
opening a second communication channel between the intermediate processing module and a destination storage, wherein the second communication channel is opened after authentication of a user account using the received user account information;
transferring the encrypted user data from the intermediate processing module to the destination storage; and
removing the user account information from the intermediate processing module;
receiving a dynamic string; and
generating a shared encryption key using an automated algorithm, wherein the shared encryption key is based at least partly on the dynamic string; and
authenticating user access to the intermediate processing module, wherein authenticating user access comprises:
receiving encrypted authentication data from the user device;
decrypting the authentication data using the shared encryption key; and
extracting the user account information from the decrypted authentication data for comparison with previously stored user account information.

7. The apparatus of claim 6 wherein the at least one set of instructions further comprises instructions for authenticating user access to the intermediate processing module, wherein authenticating user access comprises:
receiving encrypted authentication data from the user device;
decrypting the authentication data using a shared encryption key; and
extracting the user account information from the decrypted authentication data for comparison with previously stored user account information.

8. The apparatus of claim 7 wherein the at least one set of instructions further comprises instructions for:
receiving, from the destination storage, a dynamic string; and
generating the shared encryption key using an automated algorithm, wherein the shared encryption key is based at least partly on the dynamic string.

9. The apparatus of claim 6, wherein the at least one set of instructions further comprises instructions for comparing the received user account information with previously stored user account information when authenticating the user account using the received user account information.

10. The method of claim 6 wherein the at least one set of instructions further comprises instructions for compressing the user data at the intermediate processing module.

11. The apparatus of claim 6, wherein the at least one set of instructions for opening the second-communication channel comprises instruction for:
sending the received account information to a remote authentication server; and
receiving an indication of authentication from the remote authentication server when the received user account information matches previously stored user account information.

12. The apparatus of claim 6, wherein the first communication channel is an encrypted communication channel.

* * * * *